(12) United States Patent
Cook

(10) Patent No.: US 7,475,256 B2
(45) Date of Patent: Jan. 6, 2009

(54) SECURE MESSAGE FORWARDING SYSTEM DETECTING USER'S PREFERENCES INCLUDING SECURITY PREFERENCES

(75) Inventor: David P. Cook, Dallas, TX (US)

(73) Assignee: Zix Corporation, Dallas, TX (US)

( * ) Notice: Subject to any disclaimer, the term of this patent is extended or adjusted under 35 U.S.C. 154(b) by 832 days.

(21) Appl. No.: 10/616,100

(22) Filed: Jul. 8, 2003

(65) Prior Publication Data

US 2004/0025057 A1 Feb. 5, 2004

Related U.S. Application Data

(63) Continuation of application No. 09/595,416, filed on Jun. 15, 2000, now Pat. No. 6,732,101.

(51) Int. Cl.
*H04L 9/00* (2006.01)
(52) U.S. Cl. .................... 713/189; 713/193; 726/3; 380/30; 380/255; 709/203; 709/218; 707/10
(58) Field of Classification Search ............. 726/3, 726/11–12, 14; 713/150, 168, 189, 193; 380/255, 30; 709/202–203, 206, 218–219; 707/9–10, 104.1; 725/62–63, 105, 143
See application file for complete search history.

(56) References Cited

U.S. PATENT DOCUMENTS

| | | | |
|---|---|---|---|
| 5,509,000 A | 4/1996 | Oberlander | |
| 5,513,126 A | 4/1996 | Harkins et al. | |
| 5,682,460 A | 10/1997 | Hyziak et al. | |
| 5,712,907 A * | 1/1998 | Wegner et al. | 379/114.02 |
| 5,790,790 A | 8/1998 | Smith et al. | |
| 5,870,549 A | 2/1999 | Bobo, II | |
| 5,940,834 A * | 8/1999 | Pinard et al. | 707/102 |
| 6,023,700 A | 2/2000 | Owens et al. | |
| 6,061,448 A | 5/2000 | Smith et al. | |
| 6,081,899 A | 6/2000 | Byrd | |
| 6,182,118 B1 | 1/2001 | Finney et al. | |
| 6,198,824 B1 | 3/2001 | Shambroom | |
| 6,343,327 B2 * | 1/2002 | Daniels et al. | 709/239 |
| 6,356,905 B1 * | 3/2002 | Gershman et al. | 707/10 |
| 6,385,655 B1 | 5/2002 | Smith et al. | |
| 6,411,684 B1 * | 6/2002 | Cohn et al. | 379/88.14 |
| 6,442,600 B1 | 8/2002 | Anderson | |
| 6,446,115 B2 | 9/2002 | Powers | |
| 6,697,944 B1 * | 2/2004 | Jones et al. | 713/168 |
| 6,865,191 B1 * | 3/2005 | Bengtsson et al. | 370/475 |

(Continued)

FOREIGN PATENT DOCUMENTS

EP 0 838 774 A2 4/1998

(Continued)

*Primary Examiner*—Minh Dieu Nguyen
(74) *Attorney, Agent, or Firm*—Fish & Richardson P.C.

(57) ABSTRACT

A system and method for providing secure message services. The system includes a forwarding service to receive message for delivery to a recipient. The system checks for preferences for delivery of the message content including encryption preferences and notifies the recipient or delivers the message according to the encryption preferences. The system includes an interoperability engine to determine delivery preferences including security preferences, the security preferences indicating a security protocol by which the message can be securely delivered to the recipient.

13 Claims, 16 Drawing Sheets

U.S. PATENT DOCUMENTS

| | | |
|---|---|---|
| 7,051,003 B1 * | 5/2006 | Kobata et al. ................ 705/51 |
| 2002/0178231 A1 | 11/2002 | Matsa et al. |
| 2004/0006601 A1 | 1/2004 | Bernstein et al. |
| 2006/0195540 A1 * | 8/2006 | Hamilton et al. ............ 709/206 |

FOREIGN PATENT DOCUMENTS

| | | |
|---|---|---|
| EP | 0 869 652 A2 | 10/1998 |
| EP | 1 104964 A1 | 12/1999 |
| WO | WO 97/49251 A1 | 12/1997 |
| WO | WO 98/58332 | 12/1998 |
| WO | WO 99/42932 | 8/1999 |
| WO | WO 00/41533 A3 | 7/2000 |
| WO | WO 01/97089 A1 | 12/2001 |
| WO | WO 02/33872 A3 | 4/2002 |

* cited by examiner

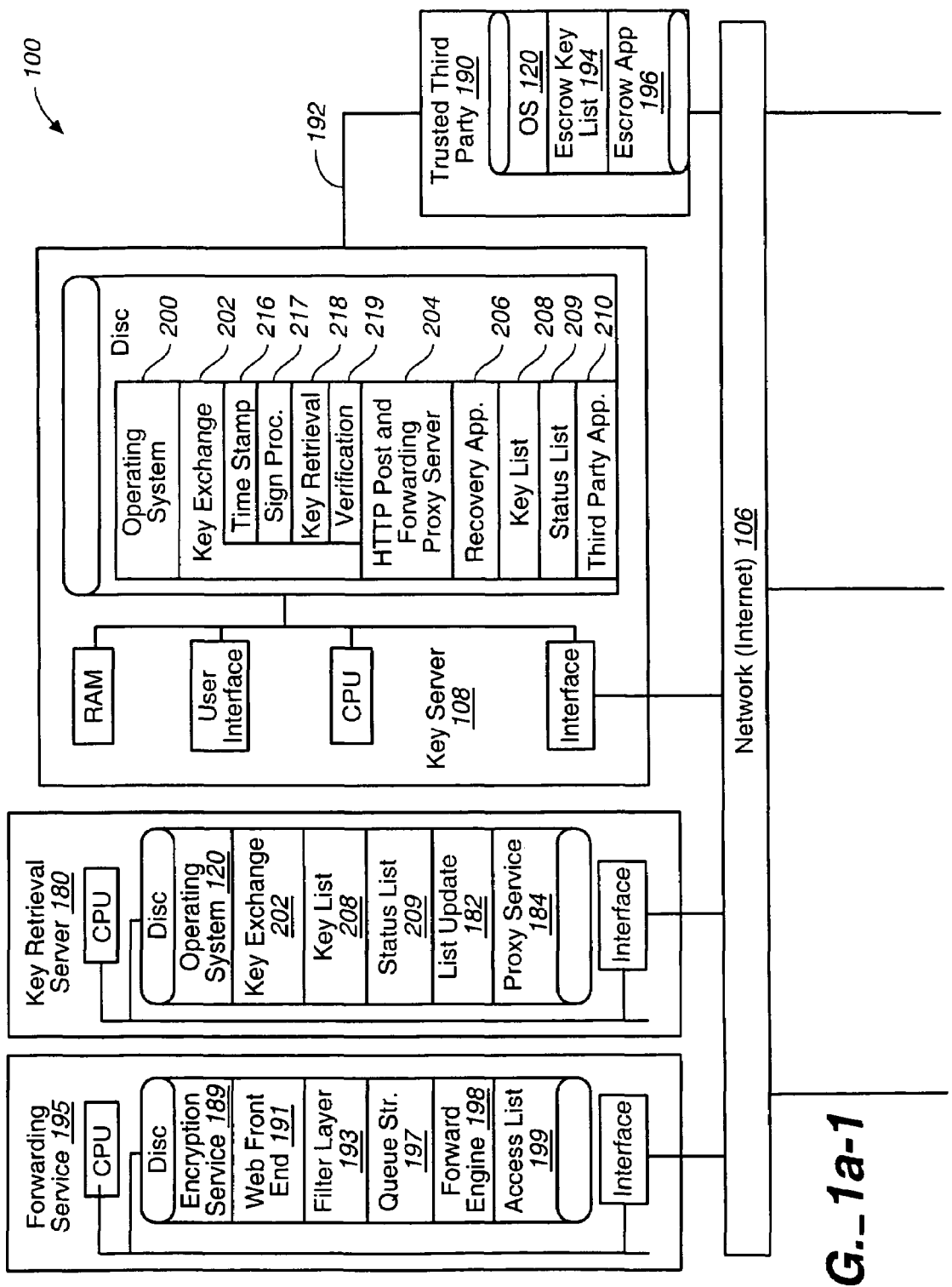
FIG._1a-1

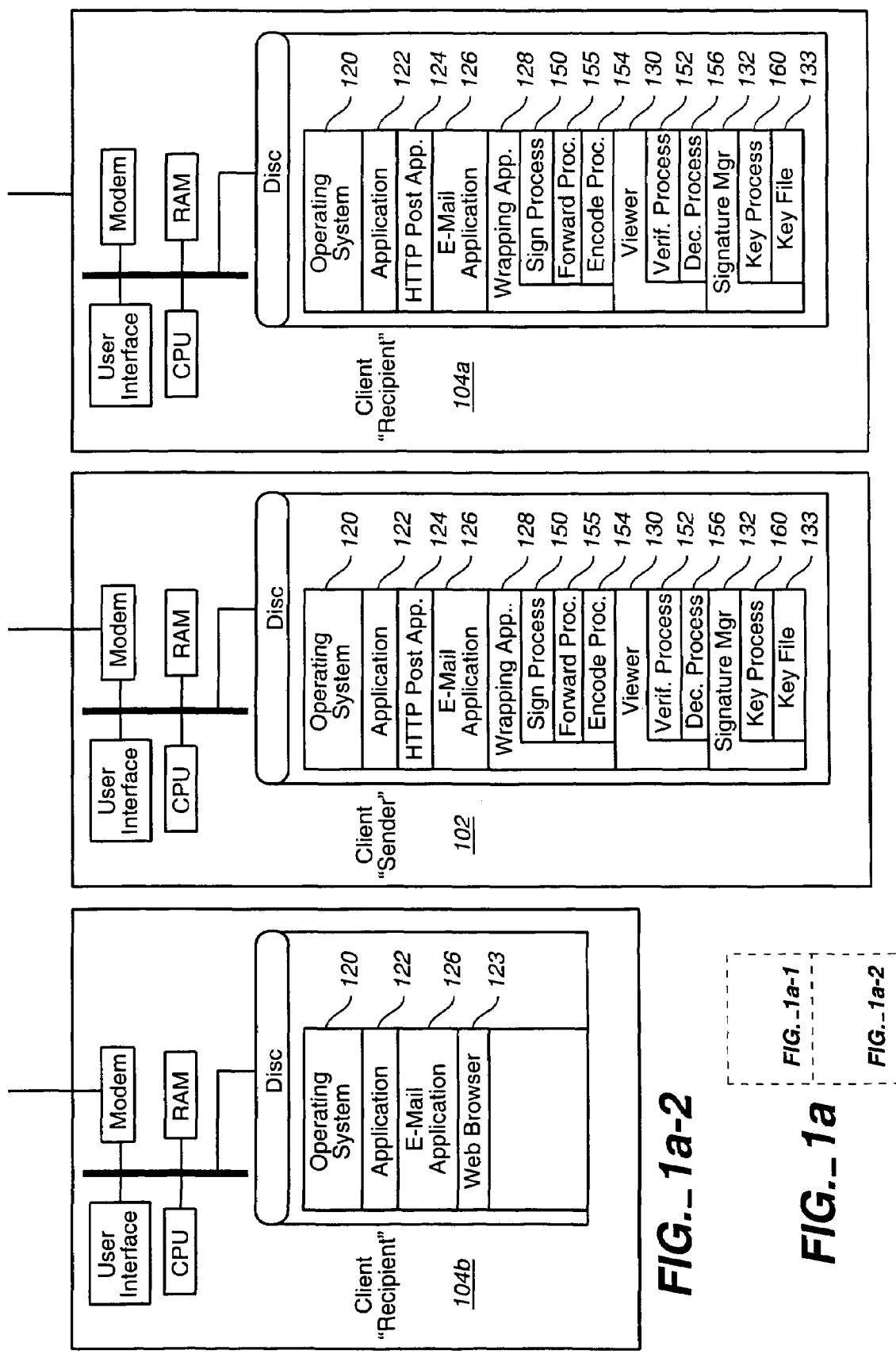
FIG._1a

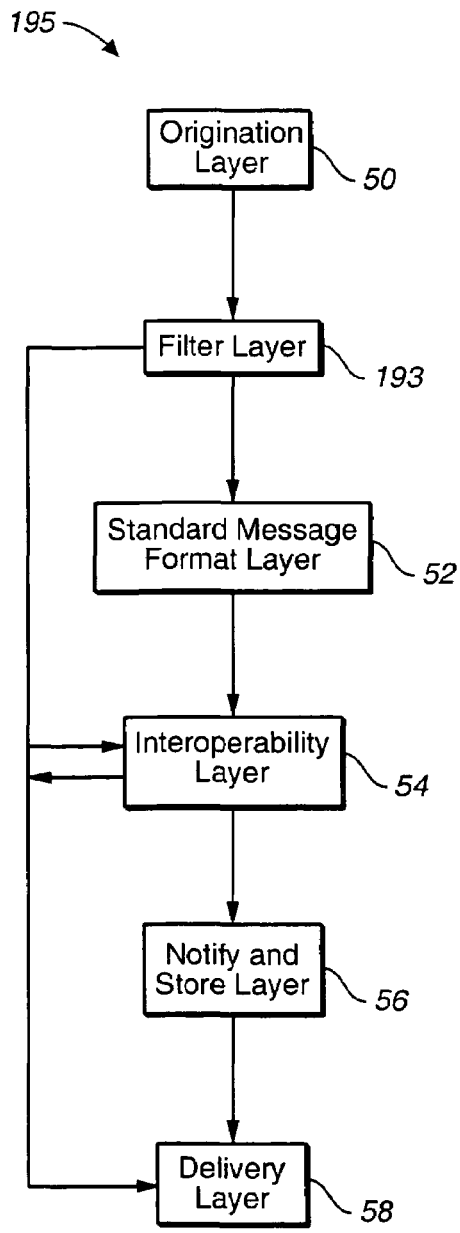
FIG._1b
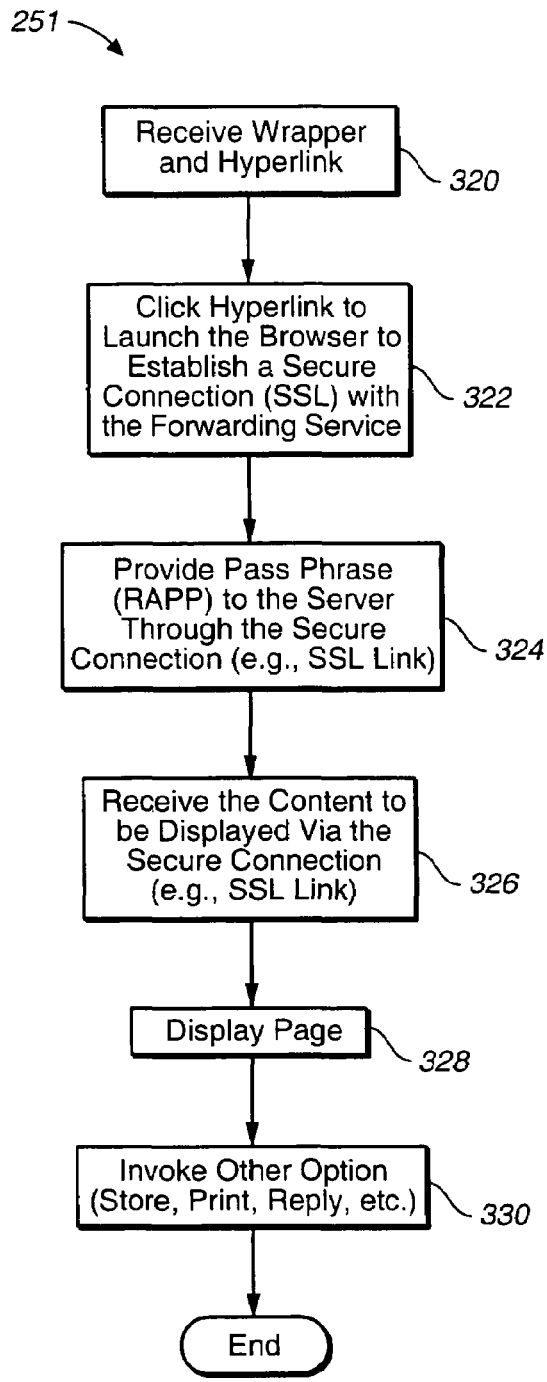
FIG._2e

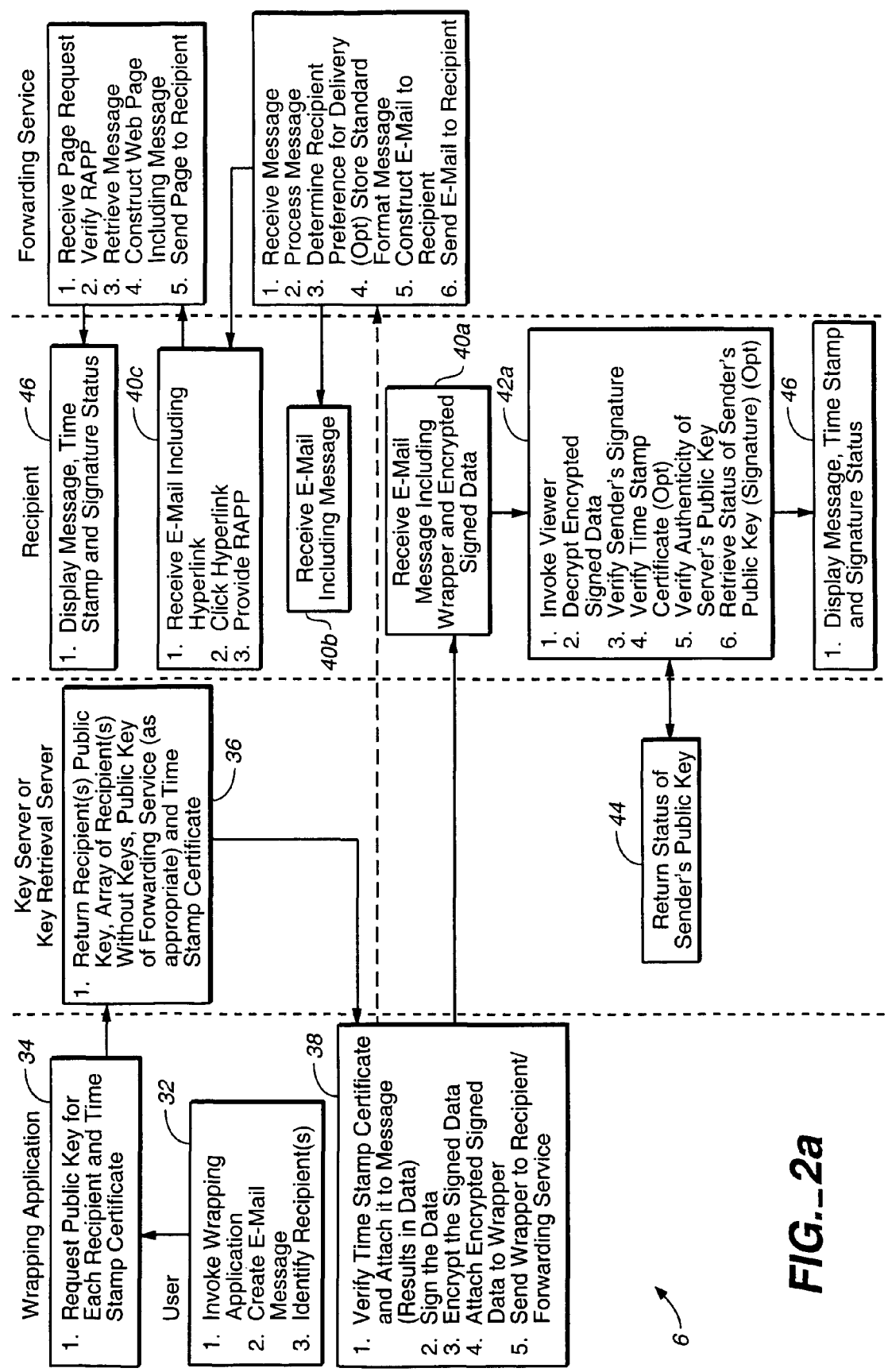
FIG._2a

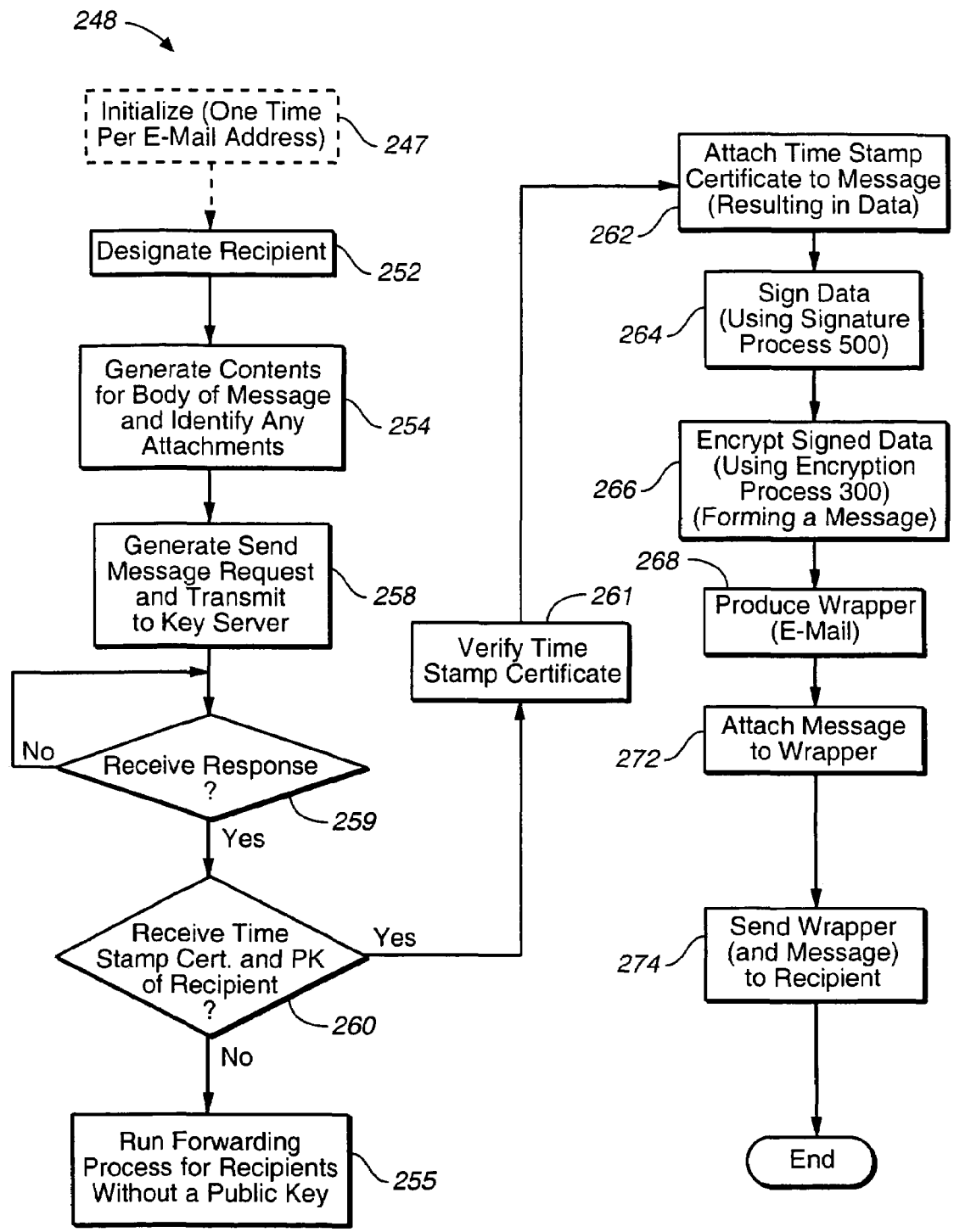
FIG._2b

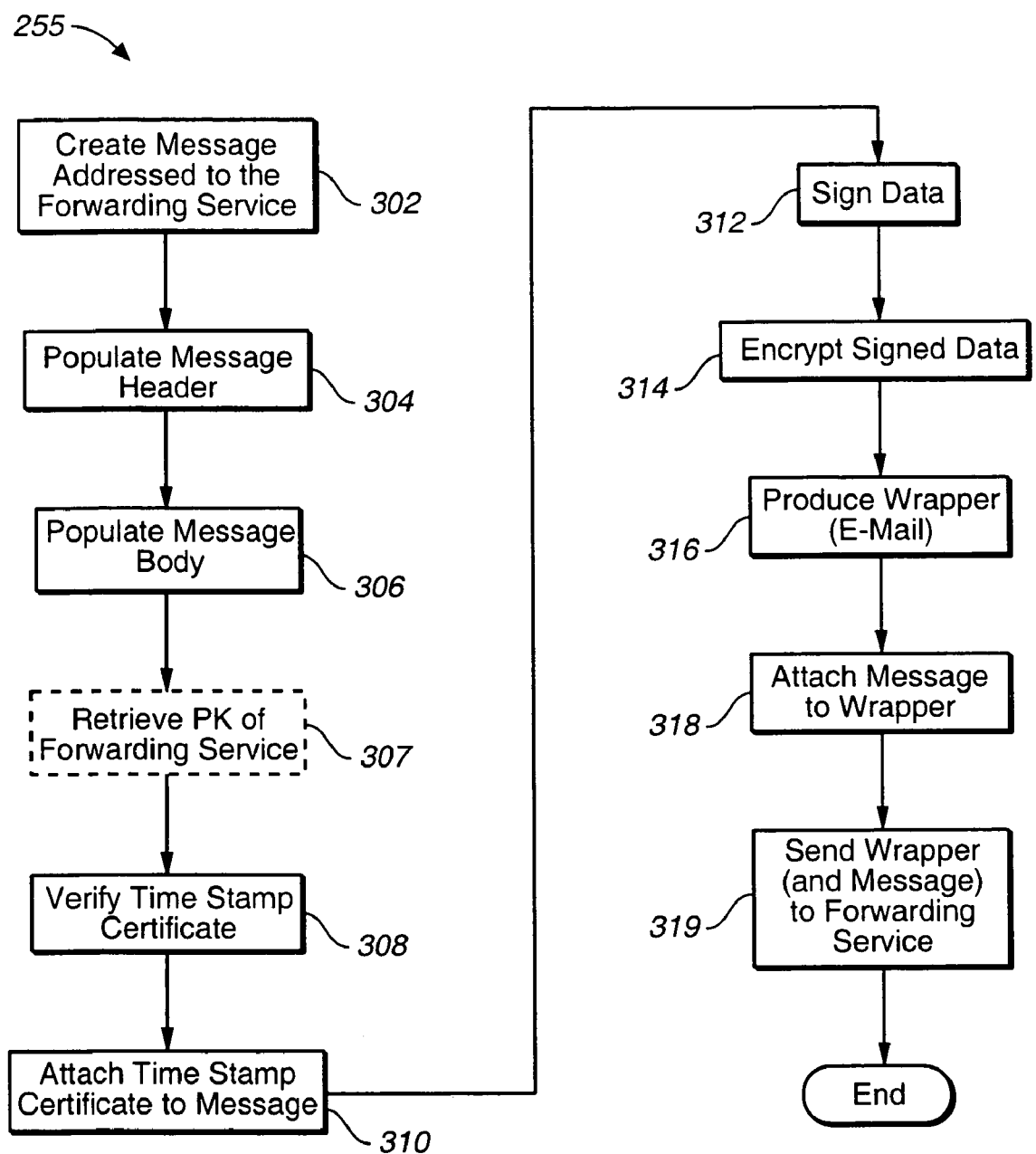
FIG._2c

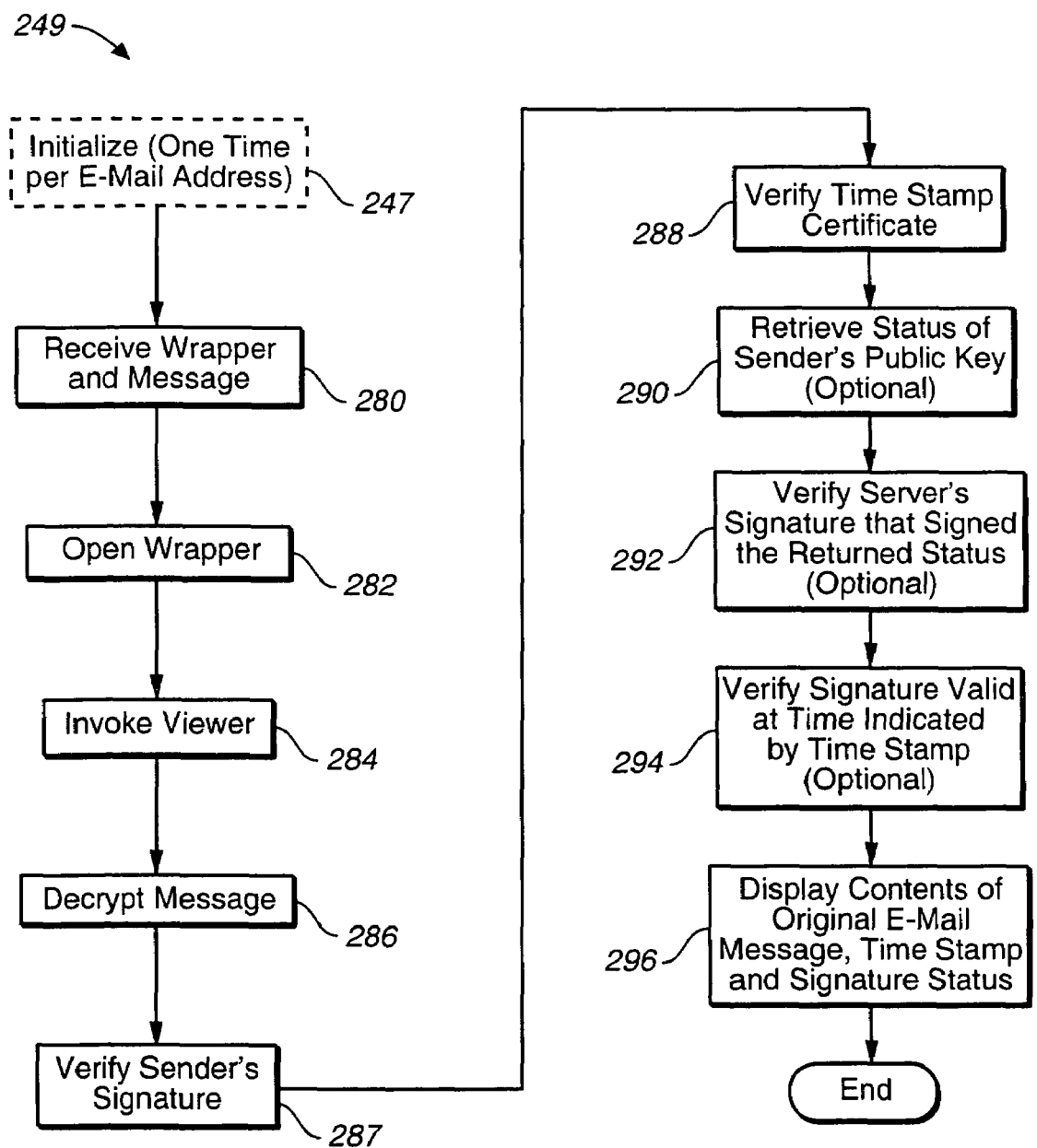
FIG._2d

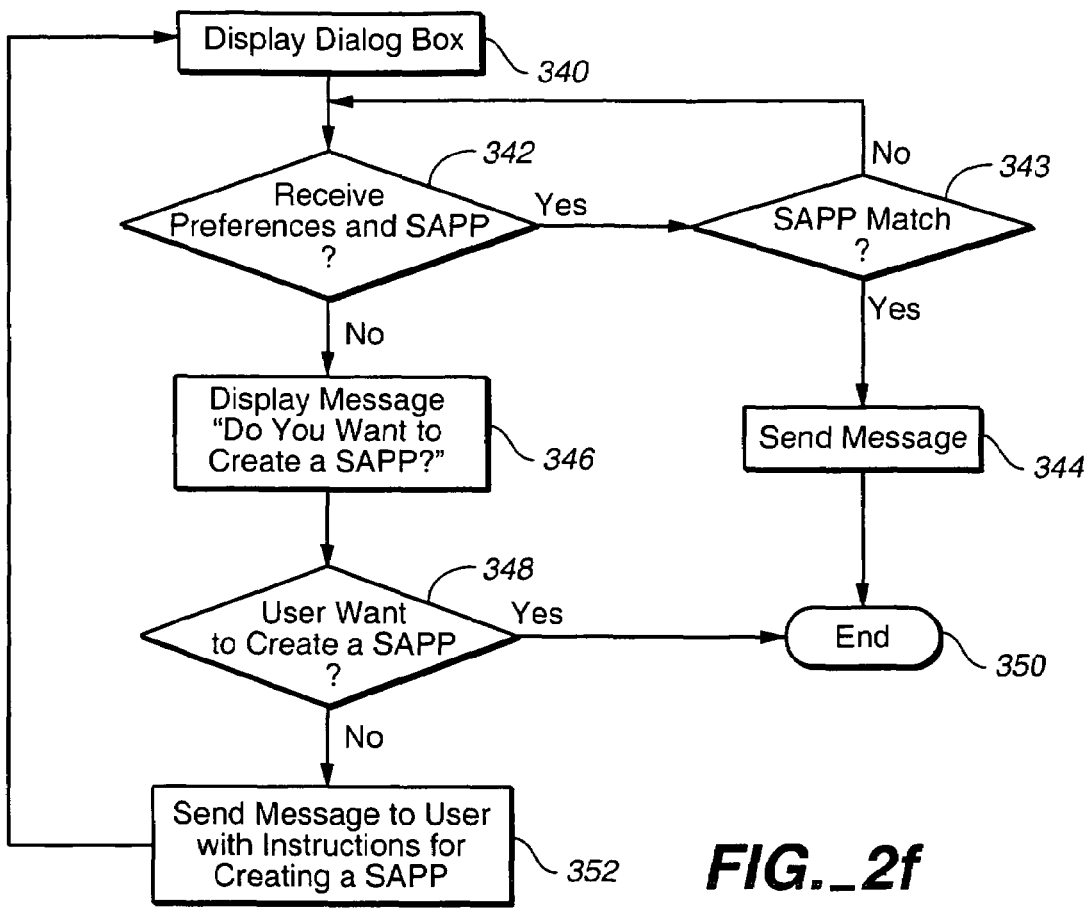
FIG._2f
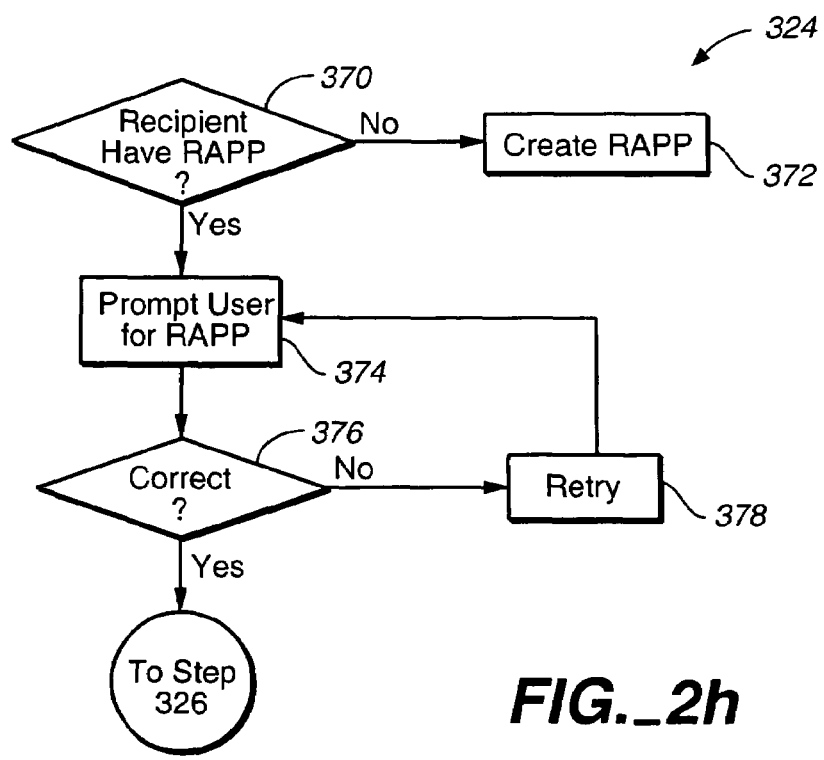
FIG._2h

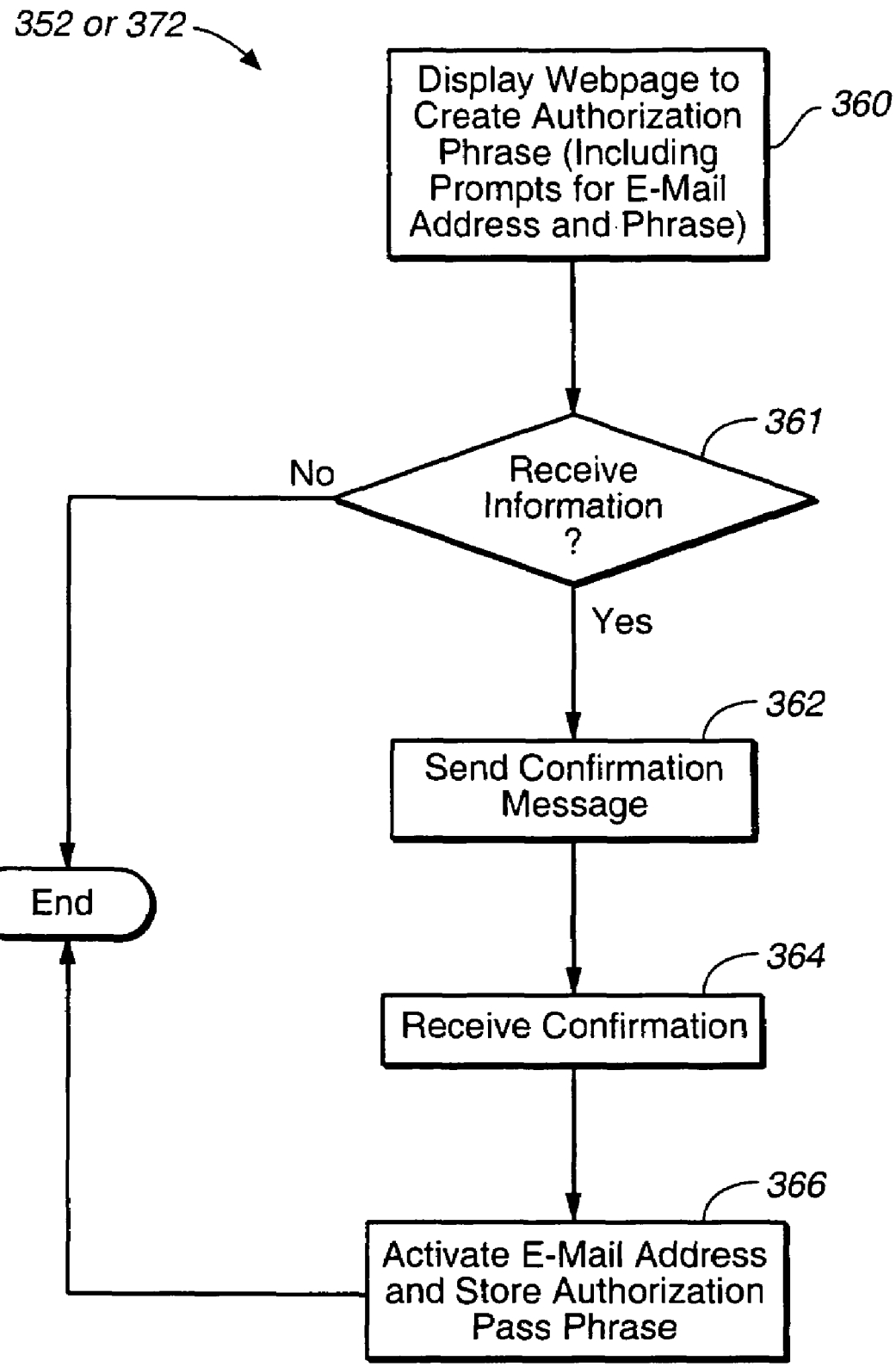
FIG._2g

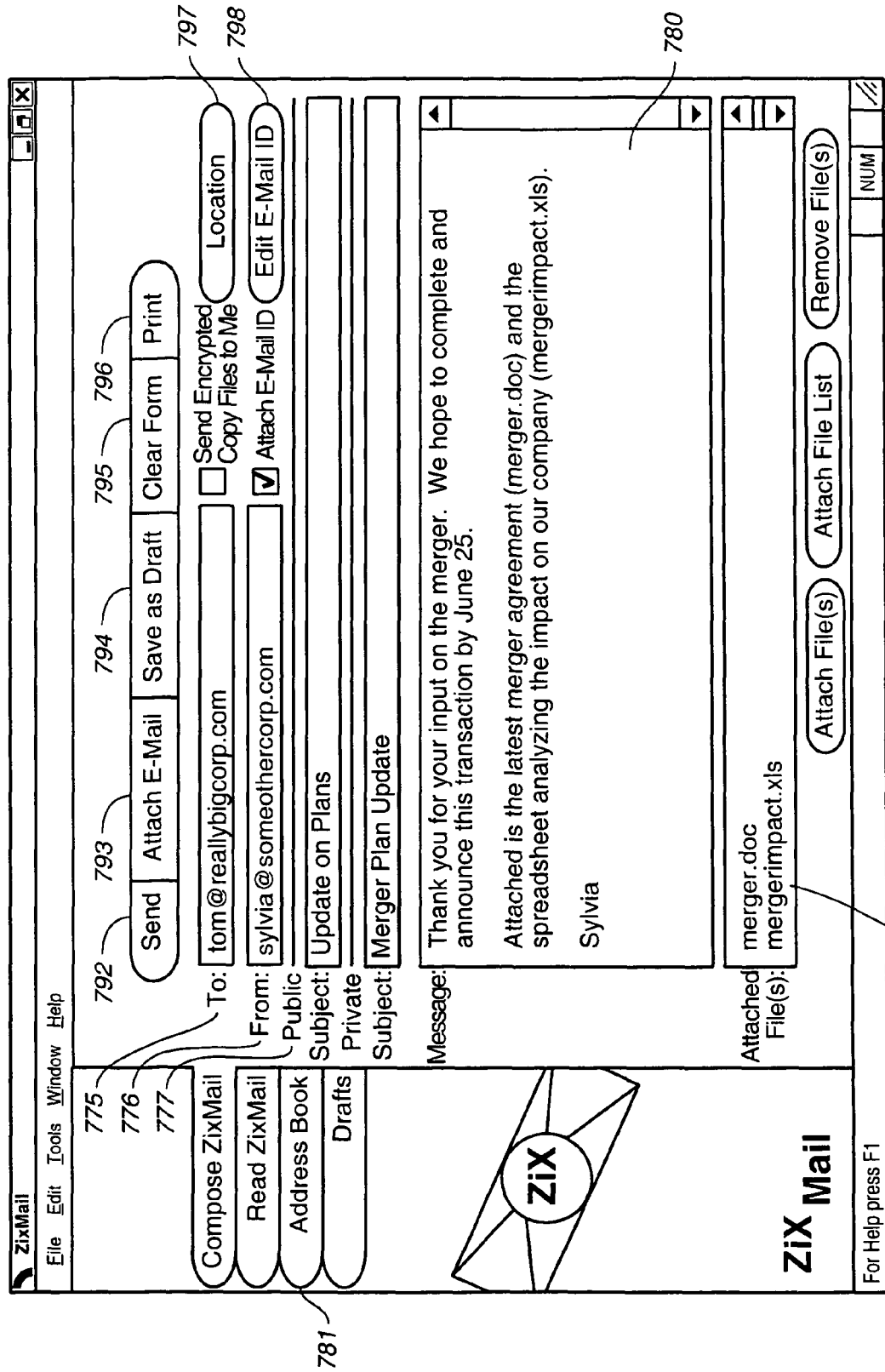
FIG._3a

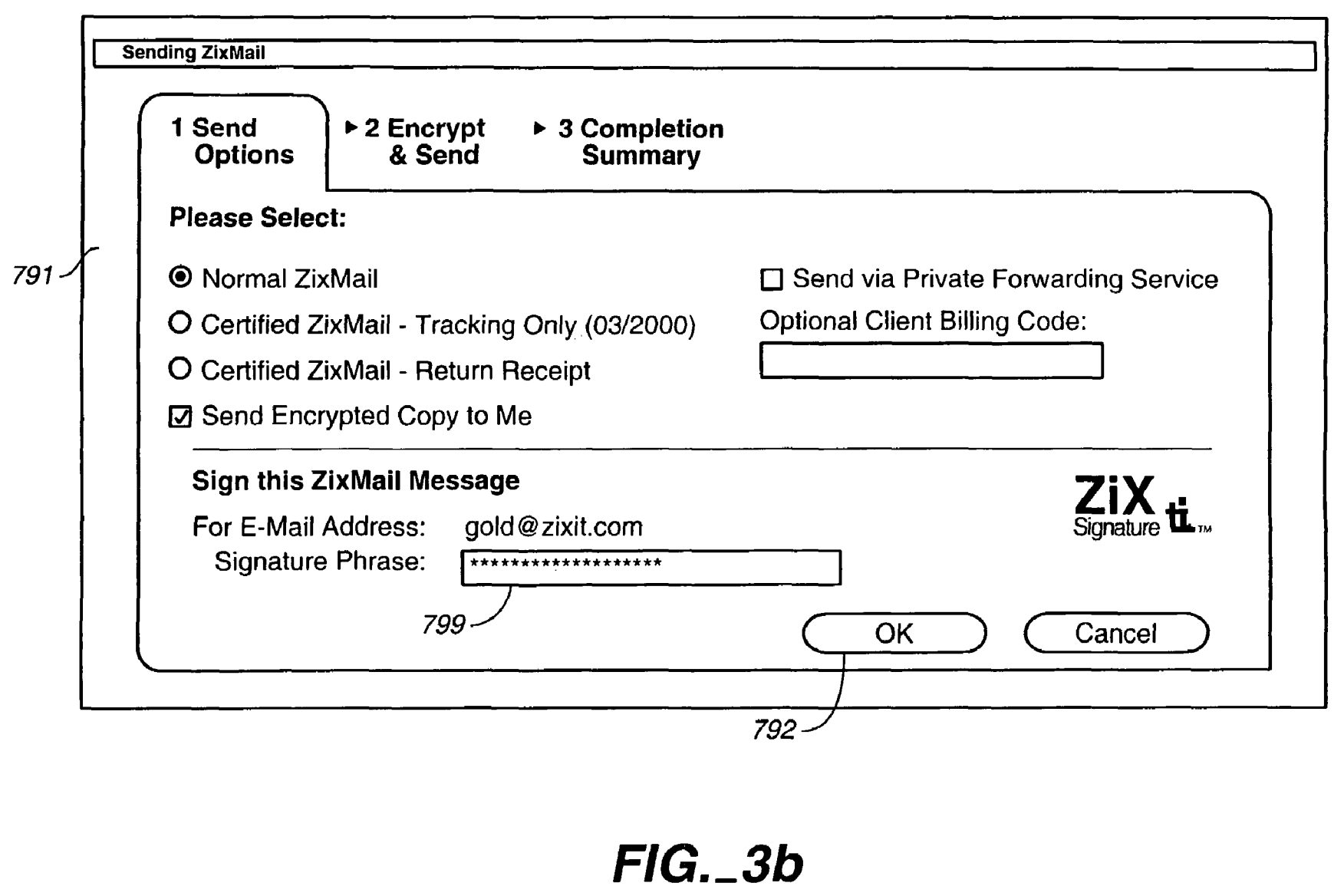

FIG._3b

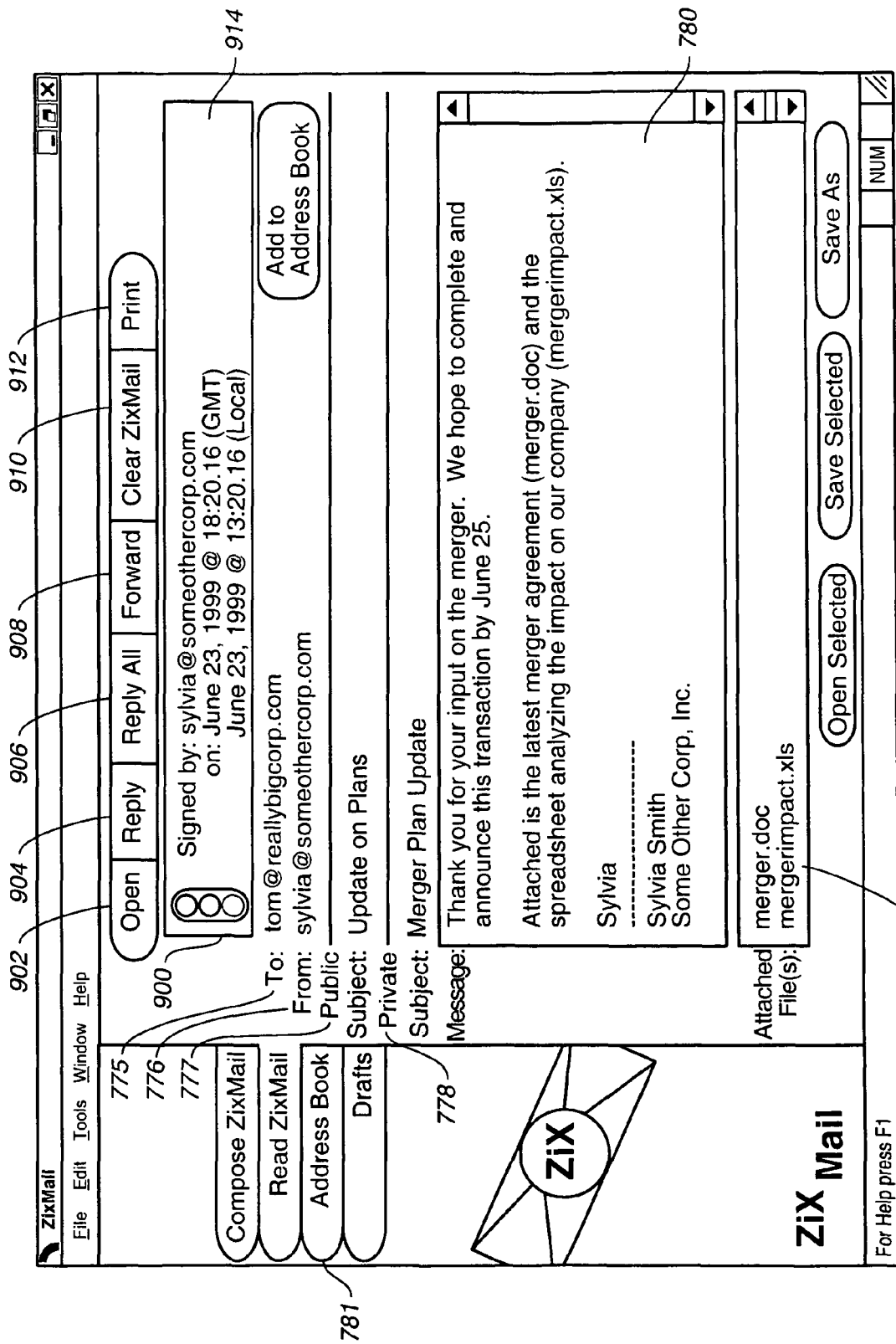
FIG._4a

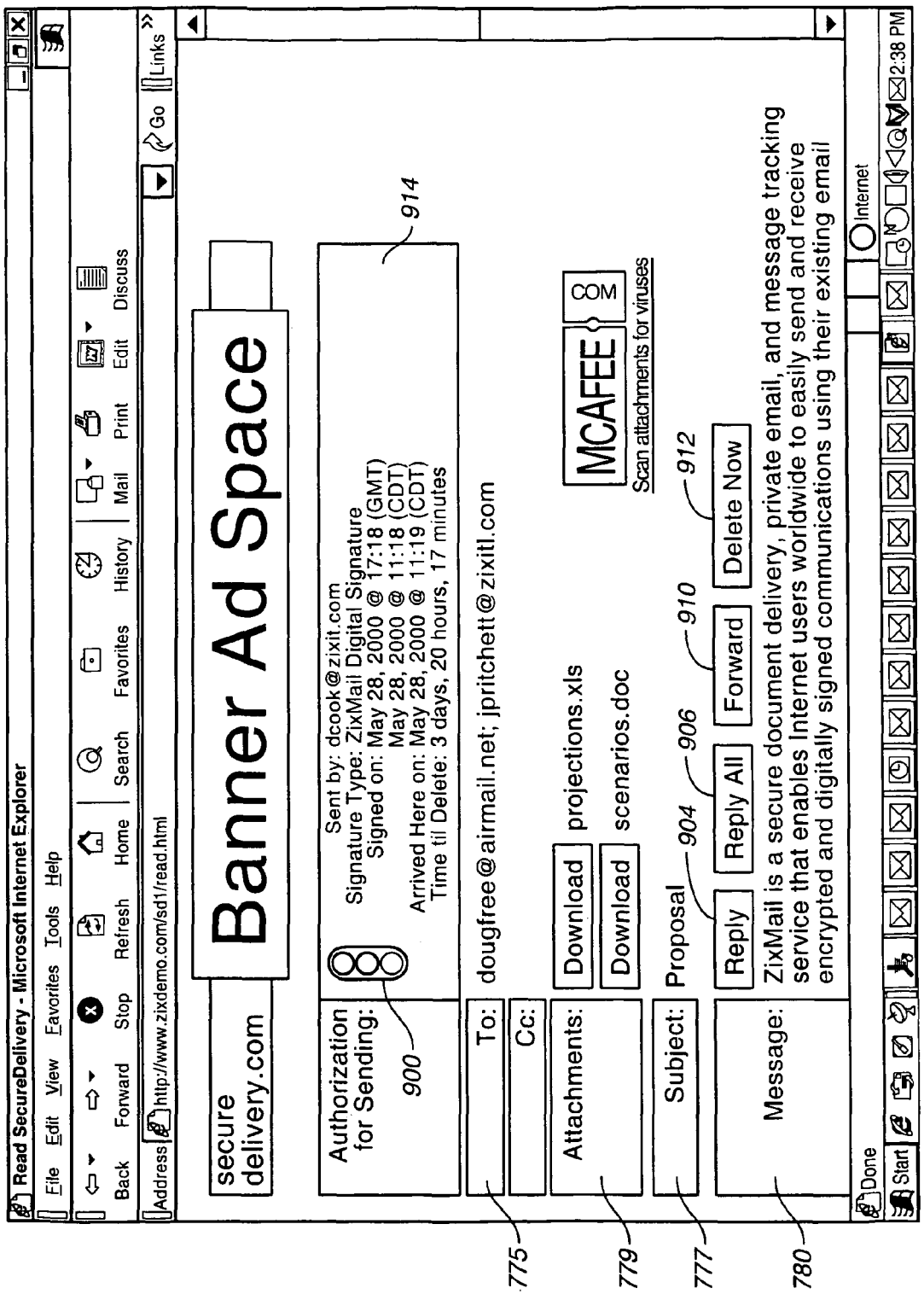
FIG._4b

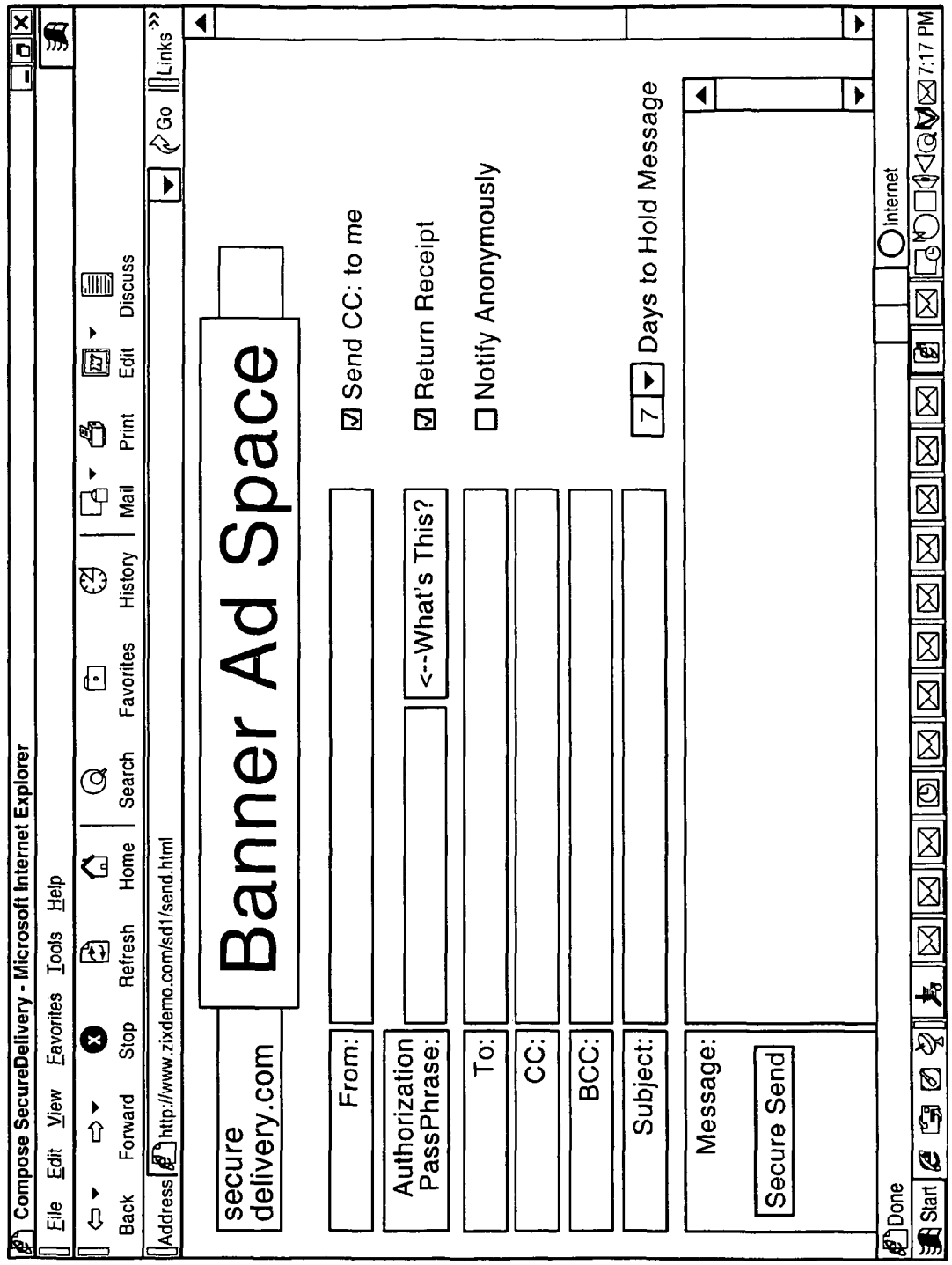
FIG._4c

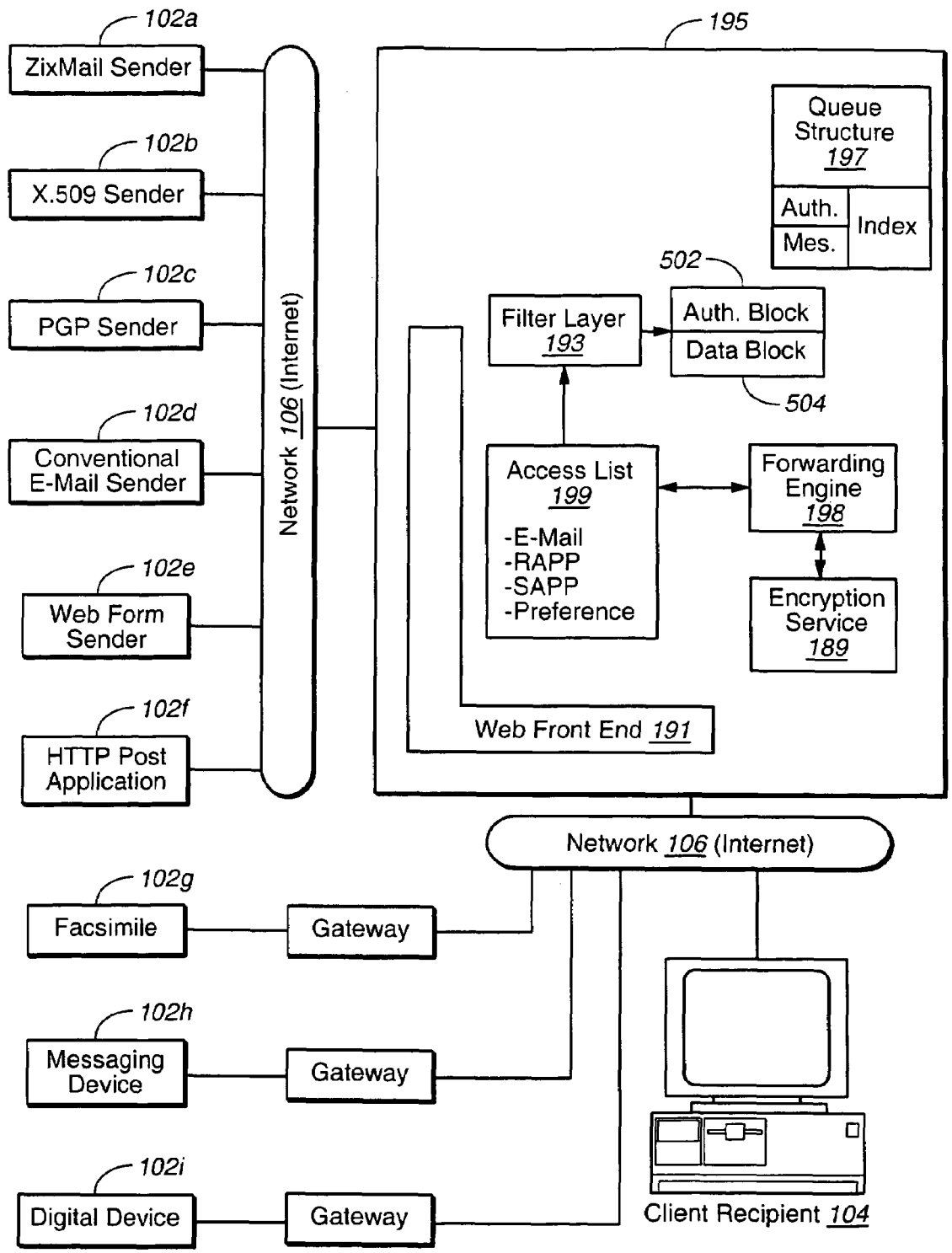
FIG._5

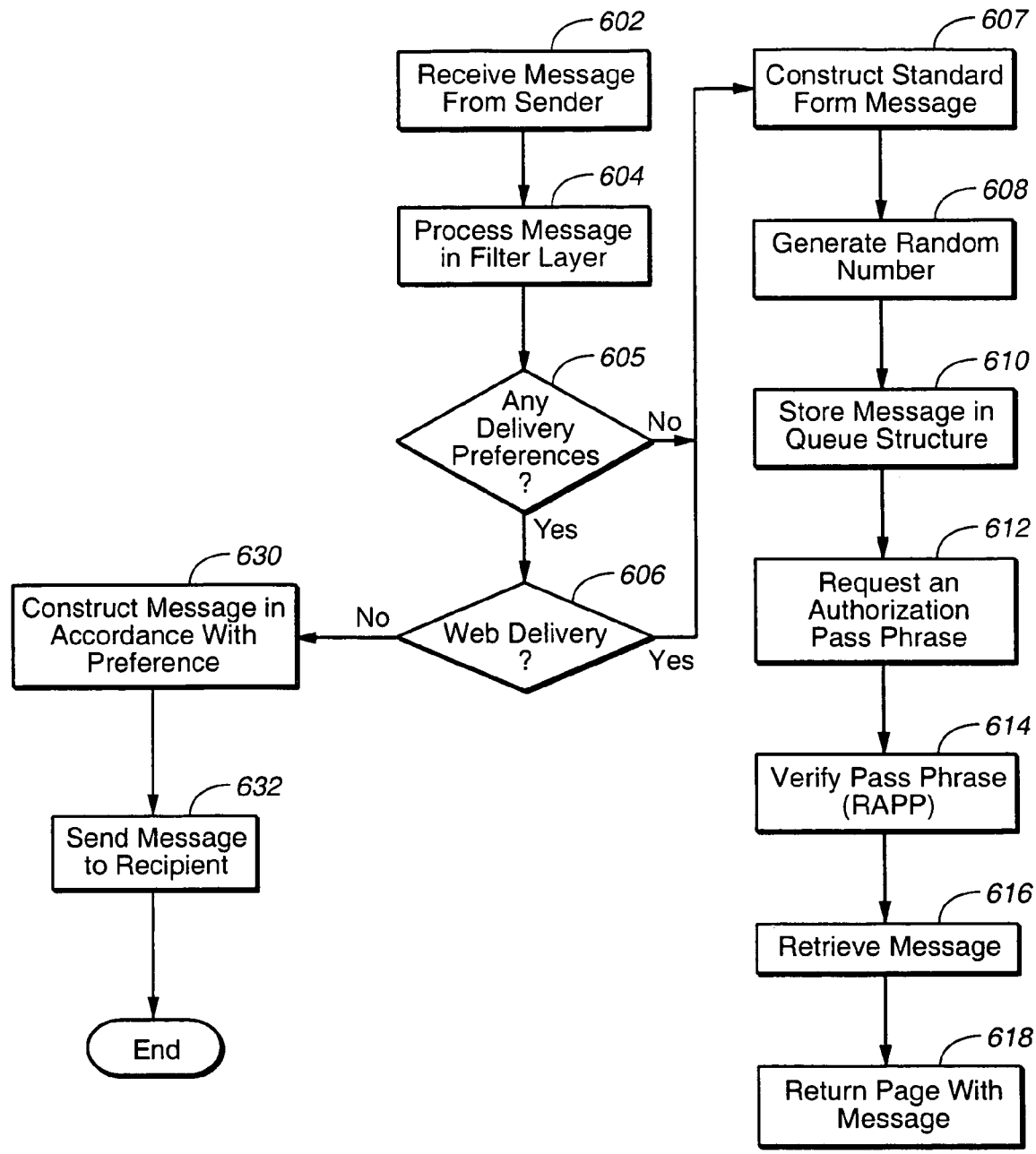
FIG._6

SECURE MESSAGE FORWARDING SYSTEM DETECTING USER'S PREFERENCES INCLUDING SECURITY PREFERENCES

CROSS-REFERENCE TO RELATED APPLICATION

This application is a continuation application of and claims priority to U.S. application Ser. No. 09/595,416, filed Jun. 15, 2000, now U.S. Pat. No. 6,732,101, which is incorporated herein by reference.

FIELD OF THE INVENTION

The invention relates generally to computing systems and more particularly to a method and system for providing secure data transmissions between Internet users.

BACKGROUND OF THE INVENTION

The Internet is a global network of computers that uses a common communication protocol, the Transfer Control Protocol/Internet Protocol (TCP/IP), to transmit data from one location to another. Many application specific tasks, such as E-mail transmission and file transfer, are not directly supported by TCP/IP. Instead, support for these services is implemented by application specific protocols that in turn rely on TCP/IP for basic data transport services. One problem that is relatively unknown to individuals that make use of the Internet is the ease by which information can be obtained during transmission by unauthorized eavesdroppers. For example, most E-mail transmissions over the Internet are sent in cleartext. Cleartext is unencrypted data that can be intercepted anywhere along the path between a sender and the recipient.

Accordingly, sensitive business or personal information should not be transmitted in cleartext over the Internet. To do so is to risk its publication. To avoid this risk, sensitive data is often sent by courier services or other means at great cost.

Encryption mechanisms can be used to ensure the integrity of information sent over the Internet. Two common encryption techniques, symmetric key encryption and public key encryption, are described below. In a symmetric key encryption, a unique key is identified and used by the sender to encrypt and by the receiver to decrypt a message. In public key encryption, separate keys are used to encrypt and to decrypt.

Both symmetric key and public key encryption require a key exchange. That is, where symmetric key encryption is used, the sender must provide the recipient with the key so that the recipient can decrypt an associated message. In public key encryption, the key exchange includes the publication of a recipient's public key that in turn is used by the sender to encrypt a message. A corresponding private key is used by the recipient to subsequently decrypt the encrypted message. Publication can be by posting the public key, for example, to a central site, or by providing the public key directly to the sender. In each of these scenarios, the recipient's computer must include a decryption engine (software) that uses an appropriate key to decrypt the message. Because there are a variety of encryption algorithms being used on the Internet, a recipient needs to have many different types of decryption engines installed to be able to receive secure messages universally. If the intended recipient does not have a particular decryption engine, the sender cannot utilize that particular encryption technique to send the secure message.

Often a sender will desire to send the same information, for example, over the Internet, to plural recipients who have different decryption engines installed. This adds an additional level of difficulty to the transmission process, because the sender must select the appropriate encryption engine for each recipient. For those recipients who do not have any decryption engine installed, the message simply cannot be sent securely.

With the promulgation of the Internet, a globally available decryption engine has been installed in almost all new personal computers in the form of a web browser that supports the secure socket layer (SSL) protocol. What is desirable is a system that allows the recipient to use this universally available decryption engine to receive secure messages from any sender regardless of what encryption engine the sender uses. In addition, the system should allow a sender to use one encryption engine to deliver the message to any recipient regardless of what decryption engine the recipient uses. In case the sender and the recipient have compatible encryption and decryption engines, the message may be sent directly. In case the sender's encryption engine and the recipient's decryption engine are not compatible, the system will translate the message format to ensure universal interoperability between encryption and decryption engines

SUMMARY OF THE INVENTION

A system and method for providing secure E-mail services. The system includes a forwarding service operable to receive an E-mail message for delivery to a recipient, store the message at least temporarily in a storage means and check for recipient preferences for delivery of the E-mail message content. If no preference is specified and if Web-based delivery is specified, the system provides an E-mail notification to the recipient including a secure link to the message and responds to a page request from the recipient indicating the message including extracting the message from the storage means, formatting the message as a page and delivering the page to the recipient's web browser. If a preference for delivery other than Web-based is specified, the system delivers the message in accordance with the recipient's preference.

Implementations of the invention can include one or more of the following advantages. Messages can be encrypted using any available encryption means at the sender and sent to a forwarding service. The forwarding service can forward the message to each recipient according to the recipient's decryption capability and preference.

A system is provided for secure E-mail services. Secure E-mail messages can be composed or generated using the secure messaging system (using a particular encryption service), the result of which can be attached as a MIME or SMIME message to a conventional E-mail message for transfer to a recipient. In the event the recipient does not have the required decryption capabilities, the E-mail message can be forwarded to a forwarding service. The forwarding service provides an E-mail notification to the recipient of the message. A recipient is not required to have a special viewer or reader and can merely retrieve the message through a web browser by linking to the forwarding service via a secure link such as SSL. Alternatively, if the recipient has designated a preference for delivery, the message can be re-encrypted according to the recipient's preference and delivered to the recipient directly in accordance with the predefined delivery instructions.

These and other advantages of the present invention will become apparent from the following description and from the claims.

BRIEF DESCRIPTION OF THE DRAWINGS

FIG. 1a is a schematic block diagram of a computing network for facilitating a secure data exchange.

FIG. 1b is a schematic block diagram of an operational perspective of the forwarding service of FIG. 1a.

FIG. 2a shows a generalized process for securely sending and receiving encrypted E-mail over a network.

FIGS. 2b-2e show a flow diagram for a method of exchanging E-mail securely over a network between a sender and a recipient.

FIG. 2f is a flow diagram for creating a sending a message including creating a send authorization pass phrase (SAPP).

FIG. 2g is a flow diagram for creating an authorization pass phrase.

FIG. 2h is a flow diagram for receiving a message including specifying a receive authorization pass phrase (RAPP).

FIG. 3a shows a user interface presented by a wrapping application.

FIG. 3b shows a user interface presented by the wrapping application when the send button shown on FIG. 3a is depressed.

FIG. 4a shows a user interface presented by the viewer application.

FIG. 4b shows a user interface presented by the web browser application for reviewing messages.

FIG. 4c shows a user interface presented by the web browser for sending messages.

FIG. 5 is a schematic block diagram of forwarding service for facilitating a secure data exchange between various types of senders and recipients.

FIG. 6 is a flow diagram for forwarding a message through the forwarding service of FIG. 5.

DETAILED DESCRIPTION OF THE PREFERRED EMBODIMENT

Most E-mail transmissions sent over the Internet are not secure. The contents of a transmission can be compromised by interlopers along the path traversed by the message when traveling from the sender to the recipient. Additionally, incoming and outgoing email messages are normally stored on servers that are accessible to computer department personnel or other Internet Service Providers. The present invention provides a communication system for securely and easily generating, sending and viewing E-mail transmissions or other messages sent to a recipient over a network.

A number of terms are used herein to describe network transmissions and related structures and processes.

"Authorization phrase" or "authorization pass phrase" refers to a password or pass phrase that may be supplied by a sender or a recipient to gain access to services provided by a forwarding service. The forwarding service is described in greater detail below.

"Client" refers to a computer program that, among other functions, requests services from a server and more generally as the computer that runs a client program or a browser. Here, a client program includes a communication program for sending electronic messages (such as E-mail) to other clients through a network, or for interpreting messages from other clients.

"Server" refers to a computer program that provides services to clients, and more generally refers to a computer that runs a server program. "Key server" refers to a computer that includes a server program for maintaining, validating and distributing public keys for use by clients in transmitting secure E-mail or other messages over a network.

"Exchange" refers to a communication between a client and a server over a network. The exchange occurs along a connection path between client and server and includes a request (generated by the client) and a response (from the specified server). Requests and responses can be generated by each of the client and server depending on the exchange.

"Secure transmission" or "secure E-mail transmission" refers to a secure communication between two endpoints over a network. Such a communication can be highly secure and include a wrapper, an encrypted message, a signature, and a time stamp certificate. Alternatively, the communication can have minimal security and include only a wrapper and a link to a message that is secured by using a transmission protocol (e.g., secure socket layer (SSL)) between devices. The wrapper can be received by a recipient's conventional E-mail service. The message (and other information e.g., signature and time stamp) can be recovered (and verified) by the recipient by invoking a secure message viewer at the recipient client computer or through a web browser.

"Network" refers to a private or public network. Private networks include an intranet, that is, a network connecting one or more private servers such as a local area network (LAN). Alternatively, the network can be a public network, such as the Internet, in which data is passed over non-secure communication links. The network configuration can include a combination of public and private networks. For example, two or more LAN's can be coupled together with individual terminals using a public network such as the Internet.

"Internet" refers to all of the networks that use the TCP/IP suite, which cooperate to form a seamless network for their collective users. The invention has particular applicability to exchanges on the Internet between clients. However, other exchanges over other networks can also benefit from the secure transmission features disclosed herein.

"Encryption" refers to a process of encoding a document to hide its content from anyone except an intended recipient. "Decryption" refers to the reciprocal process of recovering the original document by a recipient. "Symmetric key encryption" refers to an encryption method in which the encipher key and the decipher key are the same. In one implementation, DES or Triple DES encryption is used for symmetric key encryption. "Public key encryption" refers to an encryption method in which the encipher key and decipher key are different. The encipher key can be made public to alleviate difficulty of a symmetric key exchange between the sender and recipient. The phrases "encrypted by the (recipient's) public key" and "decrypted using the (recipient's) private key" refer to steps implemented when using public key encryption. The phrases "encrypted by a session key" and "decrypted by a session key" refer to steps implemented when using symmetric key encryption.

"Signature" refers to a designator that is attached to a document that can be verified to authenticate the originator and the integrity of the document. "Signature phrase" is a password or pass phrase used to encrypt the private key to be stored on the user's computer. The signature phrase is used to derive a symmetric key which in turn is used to encrypt private key data.

"Signing" or "signed" refer to a specific operation that is applied to a document, message or string to produce a verifiable form of a signature. "Signature verification" is the reciprocal process for validating the signature produced by the signing process.

A "Time Stamp Certificate," as used herein, refers to a certificate signed by a central server (e.g., key server or key retrieval server) that is attached to a message. The time stamp certificate certifies the sender, the recipient, the time the message was sent, the message itself, the public key of the sender, and the public key of the recipient. Time stamp certificates are described in greater detail in co-pending application entitled "Secure Messaging System", filed Jun. 28, 1999, and assigned Ser. No. 09/340, 853, the contents of which are expressly incorporated herein by reference.

Referring now to FIG. 1, an interconnected computing system 100 for facilitating communication between two or more client computers (e.g., a "sender" 102 and one or more "recipients" 104) over network (Internet) 106 is shown. A key server 108 is also coupled to network 106 and can be accessed by the sender 102 and one or more recipients 104. One or more key retrieval servers 180 are also coupled to network 106 and can be accessed by any of sender 102, recipient 104 and key servers 108. The key retrieval server 180 and key server 108 can be separate servers or can be combined. A trusted third party server 190 can be coupled to key server 108 through a direct connection 192 or a secure Internet connection through network 106. Finally, a forwarding service 195 is coupled by a secure or non secure Internet connection through network 106 to sender 102 and one or more recipients 104.

Sender 102 and recipient 104 each include an operating system 120 and one or more applications 122 executing on the client computers. Recipients 104 can be of two classes: fully configured recipients 104a and minimally configured recipients 104b.

Minimally Configured Recipients

Minimally configured recipients 104b include a web browser application 123 that supports a secure communication protocol (e.g., SSL) for accessing the Internet and receiving and viewing minimally secure messages transmitted by the sender 102 and forwarded by forwarding service 195 to the minimally configured recipient 104b. In addition, minimally configured recipients 104b include an E-mail application 126 for receiving notices from forwarding service 195 that a message is available to be reviewed.

Web browser application 123 can be an Internet browser program (referred to herein as a "browser") such as NETSCAPE NAVIGATOR®. The customer can direct the browser to a web site associated with the forwarding service 195 and render or download a message from a server hosting the web site. The minimally configured recipient 104b can be implemented as a browser-based system in accordance with the standard protocols for communicating over the Word Wide Web, including SSL support. In such an implementation, a user of the minimally configured recipient computer 104b can execute browser application 123 to connect to and interact with the forwarding service 195. Forwarding service 195 includes a web front end 191 that manages the communications with the client computer (such as recipient 104b). The user of the client computer can send or receive messages to/from forwarding service 195. The details of the forwarding service are described in greater detail below.

E-mail application 126 can be any generic E-mail application, preferably an E-mail application that supports hyperlinks.

Fully Configured Recipients

Fully configured recipients 104a include decryption tools and viewers to support highly secure transmission of messages. Sender 102 and fully configured recipients 104a may include a HTTP post application 124, an E-mail application 126, a secure E-mail wrapping application ("wrapping application") 128, a viewer 130 and signature manager 132, for sending and receiving highly secure transmissions over network 106.

HTTP post application 124 can include an HTTP protocol. The HTTP protocol allows wrapping application 128 or viewer 130 to directly access key server 108 or key retrieval servers 180 via the network 106. The HTTP protocol can also be used to transmit a secure message to forwarding service 195 if the sender does not have access to an SMTP server. A process for sending secure messages using HTTP posts is described in greater detail below.

E-mail application 126 can be any generic E-mail application that allows MIME attachments. Examples include CCMail, Netscape Messenger and Microsoft Outlook.

Wrapping application 128 can be invoked to wrap a secure E-mail and apply a signature that can be verified by a recipient. Wrapping application 128 includes a signing process 150 and encryption process 154. Signing process 150 receives as an input a user signature phrase which is used to decrypt the user's private keys. The private keys are used to sign a message to produce a signed message. Encryption process 154 operates on the signed message to produce an encrypted message. The encryption process 154 generally requires the retrieval (or pre-retrieval) of a public key for each recipient of a secure message. Some recipients may be minimally configured recipients 104b and may not have a public key. Other recipients may prefer to receive their messages using an alternative secure messaging system than that chosen by the sender. To provide secure transmissions to these other recipients (e.g., minimally configured recipients 104b and other recipients without a locatable or valid public key), wrapping application 128 includes a forwarding application (forward process) 155 that can be used to forward secure messages to a recipient using forwarding service 195. The processes of signing, encrypting and forwarding a message are described in greater detail below.

Viewer 130 can be called from E-mail application 126 and used to view a secure E-mail transmission. Viewer 130 includes a verification process 152 and decryption process 156. Decryption process 156 decodes encrypted messages produced using encryption process 154. After decryption, verification process 152 can be invoked to authenticate signatures produced using signing process 150. In one implementation, wrapping application 128 and viewer 130 are bundled in a single application.

Signature manager 132 is a utility for managing encryption keys for a user. Prior to the use of wrapping application 128 or viewer 130, each user (e.g., sender 102 or fully configured recipient 104a) must generate public and private keys. Signature manager 132 includes methods for generating public and private keys. Signature manager 132 submits the public key to key server 108 for publication. Key server 108 publishes the public keys in a key list which in turn can be distributed to key retrieval servers 180. Signature manager 132 can be used to create new keys, change keys, delete keys or change signature phrases. Signature manager 132 includes key process 160 for creating and storing private and public keys for use in transmitting highly secure E-mail. Signature manager 132 stores a user's private key(s) in a key file 133. Key file 133 may contain a plurality of keys stored for one or more E-mail addresses. The key file 133 may be transferred from a user's computer to another computer to allow a user to send and receive secure E-mail messages on a computer other than the computer used to create the private key. The private key can be encrypted using a symmetric key derived from the signature phrase. Only persons having the correct signature phrase can recover a user's private key. Signature manager 132 can also be bundled into another application.

Network 106 can be the Internet, an intranet or a combination of public and private networks.

Key server 108 can be a server computer executing one or more server programs. Key server 108 includes one or more server applications executing on the server computer and includes an operating system 200, key exchange application 202, HTTP post and forwarding proxy server application 204, recovery application 206, key list 208, status list 209 and trusted third party (TTP) application 210. In one implementation; key server 108 and key retrieval server 180 are the same server.

Key exchange application 202 operates to retrieve recipient and sender public keys, as well as public key status. The sender uses wrapping application 128 to retrieve the recipient's public key in order to encrypt a message so that only the recipient can read it. The recipient can use viewer 130 to retrieve the status of the correct public key of the sender so as to verify the integrity of the message and attached signature received from the sender. The exchanges between clients and key server 108 can themselves be secure as is described in greater detail below. Key exchange application 202 includes time stamp process 216, (server) signing process 217, key retrieval process 218 and status verification process 219.

Time stamp process ("stamp" process) 216 is invoked when the sender retrieves the recipient's public key. In one implementation, a time stamp is signed by the server (producing a time stamp certificate) making the time stamp difficult to forge. The time stamp certificate can be included in the secure message sent by the sender to indicate irrefutably the time the message was sent to the recipient.

Server signing process 217 can be invoked by key server 108 to sign public keys stored in key list 208 with the private key of the server. In addition, server signing process can be used to sign messages transmitted back to a client including signing a time stamp to create a time stamp certificate.

Key retrieval process 218 is invoked when a sender retrieves public keys of a recipient from key list 208. The public keys in key list 208 can be indexed by E-mail address and by a hash (or hashes) produced from an E-mail address. A second list, a status list 209, is maintained by key server 108. Status list 209 can be indexed by a key identifier (ID), which can be generated by taking a hash (or hashes) of an associated public key. Hash functions are described in greater detail in "Secure Messaging System." Each entry in the status list includes a key ID, an associated E-mail address, a current status field and a valid time field. The current status field indicates the status of the public key, such as active, inactive, suspended, removed, hidden or deleted. The valid time field can indicate the date and time span over which the public key was (is) valid. Status list 209 can include all keys currently in key list 208 as well as all keys that have been deactivated, suspended, removed, hidden or deleted.

Server status verification process 219 is invoked by the recipient of a secure message to check the status of the message sender's public key.

HTTP post and forwarding proxy server application 204 provides an easy means of transmitting messages without requiring a sender to have access to a SMTP server or other communication server. The HTTP post application in the client application sends the secure message by an HTTP post method to a forwarding proxy. In one implementation, key server 108 includes an HTTP post and forwarding proxy server application 204 which is used to recover the secure message (still secured) from the HTTP post and forward or otherwise relay the message as an attachment to a conventional E-mail message. In one implementation, a plurality of dedicated forwarding proxy servers are provided, each separated from the key server, where the number is set based upon system requirements.

Recovery application 206 is invoked by a user (sender 102 or recipient 104) and supports the recovery of the private key of the user in the event the private key is lost or the signature phrase is forgotten.

Key list 208 is a repository for public keys. In one implementation, public keys are indexed by the owner's E-mail address and the hash of the E-mail address. A public key can be retrieved by submitting either the E-mail address or the hash of the E-mail address for the recipient (or the sender, depending upon the public key to be retrieved). A public key (PK) for the recipient is retrieved at the time a secure E-mail message is created.

Trusted third party application 210 facilitates the transfer of private keys of users to a trusted third party. Trusted third party application 210 is described in greater detail in "Secure Messaging System."

Each of key retrieval servers 180 can be a server computer executing one or more server programs. Each key retrieval server 180 includes one or more server applications executing on the server computer. Key retrieval server 180 includes an operating system 120, a key exchange application 202, key list 208, status list 209 and list update process 182. In one implementation, key server 108 is a centralized server that maintains a master key list and status list that are published to each of the key retrieval servers 180. As such, key exchange application 202 can be removed from the central server (key server) and distributed to one or more local key retrieval servers 180. List update process 182 interfaces with key server 108 to maintain current key and status lists. Key retrieval server 180 can also include forwarding proxy services 184 for forwarding HTTP posts from a sender to a recipient. The process for forwarding such messages is described in greater detail "Secure Messaging System."

Trusted third party server 190 can be a server computer executing one or more server programs. Trusted third party server 190 includes one or more server applications executing on a server computer and can include an escrow key list 194 and an escrow application 196. Trusted third party server 190 receives encrypted private keys forwarded by key server 108 from users (sender and recipient 102 and 104). Escrow services are described in greater detail in "Secure Messaging System."

Forwarding service 195 can be a server computer executing one or more server programs. Forwarding service 195 includes one or more server applications executing on the server computer and includes an encryption service 189, a web front end 191, a filter layer 193, queue structure 197, forwarding engine 198 and access list 199.

Encryption service 189 can be invoked to encrypt a message in accordance with the preferences of a recipient. As will be described in greater detail below, a message received by the forwarding service 195 can be forwarded to a recipient in plural ways. First, if the recipient is a minimally configured recipient 104b, then the forwarding service 195 can be enabled to send the recipient an E-mail message that includes instructions for how the message can be retrieved at the forwarding service 195 (viewed) using a secure web browser. If the recipient has decryption capabilities and has specified a delivery preference (e.g., using an alternative encryption/decryption technique), then the message can be delivered (e.g., encrypted) in accordance with the delivery preference. The delivery preference can include the specification of an encryption protocol. Encryption service 189 includes one or more tools for processing (e.g., encrypting) messages in accordance with each encryption protocol that is currently supported by the forwarding service 195. The encrypted message can be attached to an E-mail addressed to the recipient and forwarded using forwarding engine 198 to the designated recipient. Recipient delivery preferences are described in greater detail below.

The web front end 191 receives messages forwarded from a sender 102, the forwarding service processes the messages using filter layer 193 to produce a standard format message that can be stored in queue structure 197. The web front end 191 also receives and processes message requests received from a recipient. The processing of requests from recipients is described in greater detail below.

The processing in filter layer 193 may include parsing, decryption and authentication services as well as other services. The filter layer 193 consists of several filter units each dedicated to process secure messages sent by a particular type of sending application. In one implementation, filter layer 193 includes a ZixMail unit, a PGP unit, a web-based compose form unit, and an X.509 S/MIME unit. Other filter units can be added to the filter layer 193 as required to support other messaging formats. Regardless which filter unit of the filter layer processes an inbound message, the resulting output of filter layer 193 is always in a standard format and can be rendered to the recipient in the same fashion. This solves the long-standing interoperability problem of different secure email programs.

Each filter unit in the filter layer supports a particular messaging format. A unit may support decryption, parsing, authentication and other services as appropriate for the message format. For example, a ZixMail unit may be configured to decrypt a received ZixMail message using a private key of the forwarding service 195, authenticate the sender and message contents using an authentication routine, and parse the decrypted message to create a standard format message.

In one implementation, the standard format message data structure includes authentication data and message data (authentication block 502 and data block 504, respectively). The authentication data can be provided from the sender or developed as a result of processing by the filter layer 193. For example, the authentication data can be the result of the verification process for a digital signature. Alternatively, the authentication data may be the result of a sender provided authentication pass phrase. The standard format messages are securely stored in queue structure 197 until retrieval or other predefined criteria is encountered. Predefined criteria can include the passage of time or a removal notice from the sender.

Queue structure 197 includes a storage area for messages that may be retrieved using a web browser or other means by an intended recipient. In one implementation, the queue structure 197 includes a message area and an index area. Associated with each message (standard format message) is an index. The index can be used in a hyperlink that is forwarded to the intended recipient to identify the message. The generation of the hyperlink is described in greater detail below. In one implementation, filter layer 193, as part of the message processing operations, generates a random number that can be used as an index. Alternatively, forwarding engine 198 can generate the index.

Forwarding engine 198 constructs an E-mail to be transmitted to an intended recipient. Each E-mail includes either a hyperlink that points to a message (stored in the queue structure 197) or another specified form of the message that is designated for direct delivery to the intended recipient (where the other specified form can be an encrypted message or a cleartext message). Forwarding engine 197 forwards the E-mail to the E-mail address associated with the recipient of the message. As described above, forwarding engine 198 can be used to forward a message encrypted by encryption engine 189 or other form of the message in accordance with the recipient's preferences. The encryption of messages in accordance with recipient preferences is described in greater detail below. While forwarding engine 198 is described herein as an email notification or email delivery engine, forwarding engine 198 can be configured to deliver either a message notification or the message itself via pager, fax, voice, or other communications medium.

Web front end 191 processes requests from a recipient to display a web page that can include the message intended for the recipient. The communications between the web front end 191 and the recipient can be secured using the SSL protocol. The SSL protocol ensures privacy between a client (the recipient) and a server (the forwarding service) by using certificates to authenticate the server and optionally the client. Further, the SSL protocol supports encryption of data between the server and client. The SSL protocol is not tied to a particular application. Any application or protocol can be layered over SSL, such as the hyper text transfer protocol (HTTP) or file transfer protocol (FTP). The SSL takes care of encryption, security keys and authentication before the underlying application (e.g., the E-mail forwarding engine 198) sends or receives any data. In one implementation, in lieu of SSL, a secure communications channel can be created between the recipient and web front end 191 by use of a transmitted applet that contains encryption code and public keys for secured communications. The process of forwarding a message is described in greater detail below.

Forwarding engine 198 may also ensure that requests from the recipients are valid. Forwarding service 195 includes an access list 199 that includes a list of recipient identifiers (e.g., E-mail addresses) and authorization pass phrases (a receive authorization pass phrase or RAPP and a send authorization pass phrase or SAPP). Each entry in the access list 199 includes an identifier and a SAPP and/or RAPP. The creation of an authorization pass phrase (SAPP/RAPP) is described in greater detail below. In one implementation, the forwarding engine receives a page request from the web front end 191 that includes an authentication pass phrase from the recipient (a receive authorization pass phrase or RAPP). The RAPP can be verified prior to returning the web page including the message to the recipient. The creation of a RAPP is described in greater detail below.

The access list 199 may also include user preference data. The user preference data may specify an encryption/decryption protocol to be used by the forwarding service 195 when forwarding messages to the user. For example, when a message is received for an intended recipient, forwarding engine 198 may check the preference data associated with the intended recipient in the access list 199 to determine how to forward the message to the recipient. If recipient has no preference set or designates web delivery, then the forwarding engine 198 constructs an E-mail that includes a pointer to the message in the queue structure as described above. Alternatively, if an encryption/decryption protocol has been specified, the forwarding engine 198 can invoke the encryption service 189 to encrypt the message in accordance with the recipient's preference. Thereafter, the forwarding engine 198 can attach the encrypted message to an E-mail and forward the E-mail with attachments (if any) directly to the intended recipient. The processes invoked by the forwarding service 195 upon receipt of messages is described in greater detail below.

The operational structure of the forwarding service 195 is shown in FIG. 1b. Operationally, forwarding service 195 includes plural layers including an origination layer 50, a filter layer 193, a standard message format layer 52, an interoperability layer 54, a notify and store layer 56 and a delivery layer 58.

Origination layer 50 includes a front end (e.g., web front end 191 or E-mail application) that is configured to receive messages of various forms that are to be processed by the forwarding service. A message can be of the form of an E-mail message (received at one or more E-mail addresses associated with the forwarding service 195), a web form, a voicemail message, a facsimile or other message with or without encryption. The origination layer 50 operates to collect messages for processing by the forwarding service 195.

Filter layer 193 operates to decrypt, authenticate and parse messages in accordance with their designated format. As described above, the filter layer 193 includes plural filter units, one for each message type that specifies operations to be performed on a given message type prior to forwarding or storage in the queue structure 197. In one implementation, the SAPP associated with the sender of the message can be checked in the filter layer to ensure that the sender is authorized to use the forwarding service prior to performing other layer operations.

Standard message format layer 52 operates to produce a standard format message for each received message processed by the filter layer 193. The standard message format layer produces messages that include authentication data, message data and attachments (if any).

Interoperability layer 54 operates to decide how to forward a message to the recipient. In the interoperability layer 54, a check is made (e.g., by the forwarding engine 198) to determine if the recipient has predefined preferences for delivery. The preferences can be stored in access list 199. The preferences can specify the form of the message to be sent to the user along with forwarding instructions. For example, the recipient can have specified that all messages should be forwarded via fax. Alternatively, the recipient can specify that all messages should be encrypted according to a predefined protocol (supported by encryption service 189) and then forwarded directly to the recipient. Another preference can be the forwarding of messages using web delivery as described below. In one implementation, the interoperability layer (e.g., the forwarding engine 198) may check to see if the recipient has one or more public keys published (e.g., PGP keys, X.509 certificates, or other keys). If the user has such keys, the preference information can be evaluated to decide which encryption protocol to use in forwarding the message directly to the recipient.

In one implementation, the recipient may not directly specify a preference, yet the interoperability layer 54 may infer a preference. More specifically, the forwarding engine may check to see if the recipient has a public key published (e.g., PGP keys, X.509 certificates, or other keys). If the user has one or more of such keys, a preference can be inferred in accordance with a predefined hierarchical list of preferred secure messaging services. In each of these scenarios, where a recipient preference is determined that includes direct forwarding to the recipient of a form of the message, the processing continues in the delivery layer 58, skipping the notify and store layer 56.

The notify and store layer 56 is invoked when web (or other) delivery of the message is required. Web delivery can arise when a recipient has specifically requested web delivery in accordance with a delivery preference stored in access list 199, or where no preference is defined. In the notify and store layer 56, a standard format message is securely stored in the queue structure 197 including the associated index to the entry. Thereafter, or concurrently, the recipient is notified by E-mail, facsimile, pager or other means as specified in the preference data for the recipient or in accordance with a default specification. In one implementation, the default mechanism selected for notice is an E-mail message. The notifying message includes a link to the message stored in the queue structure 197. In one implementation, the link is a hypertext (secure) link.

The delivery layer 58 operates to deliver the message to the recipient. Delivery can be direct or through a web browser. The delivery preferences can specify delivery by web page, email, cellular telephone, facsimile, pager or other communication means. For example, if the interoperability layer determines that the message is to be delivered in accordance with a particular encryption protocol, the delivery layer ensures that the protocol is applied and the encrypted message is attached to an E-mail wrapper and delivered directly to the recipient. The delivery layer also includes a web front end for interfacing with recipients to allow for the retrieval of messages stored in the queue structure 197.

Operation

Referring now to FIGS. 1a and 2a, an overview of a process for secure transmissions between a sender and a recipient over a network is shown. The process described below includes numerous process steps that can be performed at various locations of the computing system. The description provided indicates a possible configuration for the computing system, and should not be construed as limiting. In the example shown, prior to sending or receiving secure E-mail messages, an initial (initialization) process is required to be performed to generate public and private keys for the user (sender). The initialization process is described in greater detail in "Secure Messaging System." The transmission process 6 begins with the user invoking wrapping application 128, creating a secure E-mail message and designating one or more recipients (32).

Wrapping application 128 requests the public key for each recipient and a time stamp certificate (34) from key server 108. Key server 108 obtains the sender's public key status from the status list 209 and each recipient's public key (if available) from the key list 208, generates a time stamp certificate, and returns these data to wrapping application 128 (36) (As will be described in greater detail below, the data includes a list of recipient's for whom no key (PK) was located and may include the public key of the forwarding service.).

Wrapping application 128 performs a series of operations (38) to complete the secure E-mail message construction depending on the results returned from the key server. For all recipients having public keys the operations include: verifying the time stamp certificate and attaching it to the message (forming data), signing the data, encrypting the signed data with the recipient's public key, attaching the encrypted signed data to a wrapper and sending the wrapper to the recipient. For all recipients not having public keys available from the key server the operations can include: retrieving and verifying one time stamp certificate for sending to the forwarding server and attaching it to the message (forming data), signing the data, encrypting the signed data with a public key associated with the forwarding service, attaching the encrypted signed data to a wrapper and sending the wrapper to the forwarding service. In one implementation, when an identical message is to be sent to multiple recipients who do not have keys, only one copy of the message is sent to the forwarding service. Extra data fields are included in the message containing the email addresses of these multiple recipients. The forwarding service will deliver the message to these recipients according to the preference of each recipient. Such an implementation speeds up the process of sending to multiple recipients and reduces the forwarding server storage requirement.

While wrapping application 128 is described in some specificity, any generic wrapping application layer, including those in standard industry programs, such as Microsoft Outlook, could be used to create and send the composed (E-mail) message to forwarding service 195.

Depending on whether the forwarding service is used or not, the process continues as follows.

Forwarding Service for Minimally Configured Recipients and Others

Forwarding service 195 receives, at a minimum, each message to be forwarded to a recipient(s), processes the message including authentication of the sender, checking for recipient preferences or other public key data, securely stores the message in a queue (optional) and forwards an E-mail wrapper or other message to the recipient (41). If the recipient has designated an encryption/decryption delivery protocol preference, then the E-mail wrapper includes an encrypted form of the message (encrypted in accordance with the recipient's preferences) and can be opened immediately by the recipient (40*b*).

If the recipient is minimally configured or has designated a preference for web delivery, the E-mail wrapper includes a secure hyperlink that can be invoked by the user to link, using a web browser, to the web front end 191 of the forwarding service 195. The link includes a pointer to the particular message stored in the forwarding service's queue structure 197. In this scenario, the recipient (e.g. minimally configured recipient 104*b*) receives the E-mail wrapper, including hyperlink, through a conventional E-mail service (40*c*) or other means, such as pager, facsimile, or cell phone notification. The recipient can view the message by clicking on the hyperlink and invoking web browser application 123 which in turns performs a series of operations to process and display the secure E-mail message, including attached files if any. The process includes linking to the web front end 191 associated with the forwarding service 195 and can include providing a RAPP. The forwarding service 195 processes received page requests for messages, verifies the RAPP (as appropriate) and returns a web page that includes the message from the sender (43). In one implementation, the connection between a recipient and the web front end 191 conforms with the SSL protocol for secure communications between devices. The processes invoked by each of the recipients (e.g., minimally configured recipients 104*b*) and the forwarding service 195 is described in greater detail below. In one implementation, designated recipients may receive the message via synthesized voice delivery over standard or cellular telephone connections following proper authorization.

Fully Configured Recipients

All fully configured recipients can receive the wrapper, including encrypted and signed data, through a conventional E-mail service (40*a*). Each fully configured recipient invokes viewer 130 which in turns performs a series of operations to process and display the secure E-mail message, including attached files if any. The process includes decrypting the encrypted signed data, verifying the sender's signature, optionally verifying the time stamp certificate, verifying the authenticity of the server's public key and optionally retrieving the status of the sender's public key (using the key ID) (42).

Optionally, key server 108 looks-up the status of the sender's public key and returns the status information to the recipient's viewer 130 (44). Viewer 130 displays the decrypted message and time stamp along with the sender's public key (signature) status (46). In one implementation, the key status information returned from the key server can be signed and the key server signature can be verified. The individual processes executed by the sender and the recipient are described in greater detail below.

Secure Transmission

FIGS. 2*b*-2*e* show user and program steps for secure transmissions between sender 102 and recipient 104 of FIG. 1*a*. The process includes complementary send process 248 (including forwarding process 246 shown in FIG. 2*c*) and view processes 249 and 250 on FIGS. 2*b*, 2*d* and 2*e* respectively. Prior to transmission of any secure messages, each of sender 102 and fully configured recipients 104*a* must perform an initial process (the "initialization process") 247. The initialization process includes the generation of public and private keys and the designation of a signature phrase. The public keys for all users can be published at key server 108 for ready accessibility by other clients. The initialization process is only executed once, prior to sending or receiving secure E-mail messages. Once initialized, sender 102 can compose and send secure E-mail to any recipient 104 including highly secure transmissions to recipients having a public key stored in key server 108. After initialization, a fully configured recipient 104*a* can receive and view secure E-mail from any sender having a public key stored in key server 108. Similarly, a minimally configured recipient 104*b* can receive and view secure E-mail from any sender so enabled and verify the authenticity of any secure E-mail message received or digital signature affixed thereto.

Send Process

When a sender 102 desires to send a secure E-mail message to a recipient 104, send process 248 is invoked by sender 102. As noted above, prior to sending of messages (or receipt by a fully configured recipient 104*a*) each user (sender 102 and fully configured recipient 104*a*) must perform initialization routine 247. As a reminder of this precondition, FIG. 2*b* shows an initialization step in phantom. The initialization routine is described in greater detail in "Secure Messaging System."

Referring to FIGS. 1*a* and 2*b*, send process 248 begins when wrapper application 128 is invoked which in turn requires the user to designate one or more recipients (252). The body of the E-mail message is produced and any attachments are identified (254). In one implementation, the message, including any attachments, optionally can be compressed. A send message request is generated by sender 102 and transmitted to key server 108 (258). The send message request includes the E-mail address (or hash of the E-mail address) of the recipient, the E-mail address (or hash of the E-mail address) of the sender, the public key ID of the sender, and the hash of the message to be sent. The request can itself be encoded, by first retrieving the public key for the server. The public key can then be used in encrypting the request message in order to secure the link between the sender and the recipient. When an identical message is to be broadcast to multiple recipients, the request can include the E-mail addresses (or hashes) of multiple recipients. Thereafter, the process waits for a response from key server 108 (259).

Assuming the recipient's E-mail address (or hash) is valid and locatable in the key server's key list and the key status is active, a time stamp certificate is received along with the public key(s) for the recipients that could be located (260).

Thereafter the process continues in parallel along two paths. For each recipient who had a key that could be located, an encrypted message is created and sent directly to the recipient, unless the recipient has specifically indicated a preference to the contrary by setting a flag in the corresponding key status (stored in the key status list 209). When the key server sees such a preference flag, the key server can treat the public key as un-locatable. A fully configured recipient can turn on or off this preference flag using messages signed by the corresponding key and sent to the key server 108. The process for recipients with locatable public keys is described starting at step 261. For all recipients whose public key was determined to be invalid or otherwise un-locatable, a forwarding process is invoked starting at step 255. The details of the forwarding process are described in greater detail below.

Sending Secure Messages Directly to a Recipient

Continuing along the path to step 261, the time stamp certificate is verified. The time stamp certificate serves several purposes, including: 1) establish that the message was sent from the sender to the recipient; 2) certify the time the message was sent; 3) authenticate the. recipient's and the sender's public keys; 4) certify the status of these keys at the time the message was sent; and 5) validate the integrity of the associated message.

For each recipient whose PK was returned, a message is constructed that includes the following steps. The time stamp certificate is attached to the message, forming data (262). The time stamp certificate produced and signed by key server 108 cannot be altered or attached to another message without detection. The inclusion of the key server certificate in the time stamp certificate ensures that the server's public key is authentic. Key server process 216 for retrieving a public key and for generating a time stamp certificate is described in greater detail in "Secure Messaging System."

The data is signed using a signing process (264). The processes for signing data, verifying signed data and verifying the time stamp certificate is described in greater detail in "Secure Messaging System." The signed data is encrypted by the recipient's public key (producing an encrypted message) (266). The process of encrypting data using public key encryption is described in greater detail in "Secure Messaging System." A wrapper is produced that includes the recipient's E-mail address and an optional message body (268). The message body can include information from the key server 108 including: a message indicating that a secure E-mail message is attached, service updates or any other form of information including advertisements for services or products. The secure E-mail message is attached to the wrapper (272) and the wrapper and messenger are sent to the recipient (274). In one implementation, the wrapper is an SMTP wrapper.

Forwarding Process

Forwarding process 255 includes the creation of a message addressed to the forwarding service 195 that includes an indicator for all intended recipients whose public keys could not be located. The process includes creating a message (including header and body) that is addressed to the forwarding service (302). In one implementation, the forwarding service 105 supports plural sender types (e.g., ZixMail, X.509, PGP, HTTP post, web form, regular E-mail). The addressing of each message received by the secure forwarding service 195 can include an identifier for each sender type. For example, messages from a ZixMail client can be addressed to ZixMail@secure-forwarding-service.com.

After the message is addressed, the message header (304) and body (306) are populated. The message header or the message body includes extra fields to indicate the actual recipients of the secure message as designated by the sender. These extra fields, however, will not be displayed to the recipient when the message is rendered. The header can include other data including authorization data (e.g., a SAPP). Authorization data can be used to verify that the sender is authorized to use the forwarding service 195. The use of authorization data is described in greater detail below. The body includes the message generated by the sender and can include the original sender message, attachments, and authentication data for authenticating the sender.

As described above, even when a recipient's public key is unable to be located by the key server, a time stamp certificate is returned to the sender. Here the time stamp certificate serves several purposes, including: 1) establish that the message was sent by the sender via the forwarding service; 2) certify the time the message was sent; 3) authenticate the forwarding service's and the sender's public keys; 4) certify the status of these keys at the time the message was sent; and 5) validate the integrity of the associated message. In one implementation, the public key of the forwarding service is returned to the sender whenever any recipient's keys are unable to be located. The public key of the forwarding service is used to securely transmit the message to the forwarding service. Alternatively, the public key of the forwarding service can be separately requested, embedded in the sender's client application 102, or otherwise discovered (as shown in phantom step 307 of FIG. 2c).

The time stamp certificate is verified (308) and then attached to the message, forming data (310). The time stamp certificate produced and signed by key server 108 cannot be altered or attached to another message without detection. The inclusion of the key server certificate in the time stamp certificate ensures that the server's public key is authentic. The key server process 216 for retrieving a public key and for generating a time stamp certificate is described in greater detail in "Secure Messaging System."

The message is then signed using a signing process (312). The signed message (data) is encrypted by a public key associated with the forwarding service (producing an encrypted message) (314). The process of encrypting data using public key encryption is described in greater detail in "Secure Messaging System."

A wrapper is produced that includes the forwarding service's address (316). The sender's message is attached to the wrapper (318) and the wrapper and message are forwarded to the forwarding service 195 (319). In one implementation, the message is forwarded to the forwarding service using a conventional E-mail service. In an alternative implementation, the message is HTTP posted to the forwarding server.

View by a Fully Configured Recipient

View process 249 (FIG. 2d) includes numerous steps. As noted above, prior to receipt of messages by a fully configured recipient (or transmission by a sender to a recipient) each user must perform an initialization routine 247. As a reminder of this precondition, FIG. 2d shows an initialization step (247) in phantom. View process 249 begins with the receipt of the wrapper and attached secure E-mail message (280). The wrapper is sent to the recipient using the recipient's E-mail address and arrives at the recipient's E-mail mailbox. The wrapper is opened using the recipient's conventional E-mail application (CCMail, Outlook and the like). The recipient invokes viewer 130 to unwrap the document. More specifically, the recipient opens the wrapper (282) and clicks or double clicks on the attached secure E-mail message to invoke viewer 130 (284). Viewer 130 decrypts the encrypted message included within the attached secure E-mail message in accordance with a decryption process (286). Viewer 130 verifies the sender's signature (287) and the time stamp certificate (TSC) (288) using verification processes described in detail in "Secure Messaging System."

Viewer 130 optionally retrieves the status of the sender's public key (e.g., from key server 108 of FIG. 1) (290). Thereafter, viewer 130 optionally verifies the server's public key that signed the returned status information using a verification procedure (292) and verifies that the public key of the sender was valid at the time indicated by the date stamp when the message was sent (294). Finally, the original contents of the E-mail message, the TSC and the signature status is displayed (296). Thereafter, the process ends.

View by a Minimally Configured Recipient

View process 251 for minimally configured recipients 104*b* (FIG. 2*e*) includes numerous steps. View process 251 begins with the receipt of the wrapper including hyperlink to the message (320). The wrapper is sent to the recipient using the recipient's E-mail address and arrives at the recipient's E-mail mailbox. Alternatively, the notification could be sent by cell phone, pager, facsimile or other notification method. The wrapper is opened using the recipient's conventional E-mail application (CCMail, Outlook and the like) and the hyperlink contained therein is invoked (clicked) which in turn launches the browser application to establish a SSL connection with the server associated with the forwarding service 195 (322). More specifically, the recipient clicks or double clicks on the hyperlink to invoke web browser 123 to retrieve a web page from the forwarding service that includes the message from the sender. Optionally, the forwarding server may require the recipient to provide an authorization pass phrase (i.e., a RAPP) to the server associated with the forwarding service 195 before sending the web page (324). If the authorization pass phrase is correct, the minimally configured recipient 104*b* receives via an encrypted communication, such as through the SSL link, the HTML content (a page, e g., HTML, XML rendering instructions or the like) to be displayed in the browser (326). Thereafter, the minimally configured recipient can display the page (328).

The page can include authentication data (optional), message data and attachments, if any. The user can view the authentication data provided by the forwarding server. The forwarding server obtains the authentication data by conducting verification steps similar to the verification steps used by a fully configured recipient to validate the message. For example, the authentication data can include a certificate of authenticity generated/verified by the forwarding service as to the authenticity of the sender. The view process may conclude at this point, or the user may invoke one or more other actions including return reply, storage or printing of the message (330). Thereafter, the process ends.

The send and receive processes described above include numerous process steps. At least eight general processes are invoked by one or more of the clients, the sender, the forwarding service and the key server in the secure transmissions including: symmetric key encryption, hashing, HASH5000, public key encryption, public key decryption, a signature process, a signature verification process and a time stamp verification process. Each of these processes is described in greater detail in "Secure Messaging System." While the process described above results in the rendering of a secure message to the recipient's browser, in an alternative implementation, approximately the same rendering can be delivered via fax or other means to the recipient.

Client Sender Process

The process 248 for sending a secure E-mail message is described above and shown in FIG. 2*b*.

The process for forwarding a secure message to a recipient is described above and shown in FIG. 2*c*.

In one implementation, similar to a minimally configured recipient, a minimally configured sender can send secure messages using a sending authorization pass phrase (SAPP). A minimally configured sender is not required to have a locatable public key, but may be required to create a SAPP. The SAPP can be a unique pass phrase. The process of sending a secure message via the forwarding service using a SAPP is shown in FIG. 2*f* and begins after a sender completes a message. The client computer displays a dialog box in a client application executing on the sender's client computer that is being used to send the message (340). The client application can be an E-mail client application such as Outlook with a "plug-in" that provides a special button connected to a DLL or other extension to handle the SAPP authorization. Other E-mail applications or other applications can also be extended in a similar way to provide such functionality. The dialog can include one or more user send preferences and a data entry field for designating a SAPP. If operating in an interactive mode, such as using a Web browser, the sender may not require a plug-in but may need to establish a secure link (SSL) in order to transmit the message to the forwarding service.

The sender may select an "anonymous" preference. In this case, all communications between the forwarding server and the recipient, including the notification messages, will not reveal the identity of the sender to any outsider. Only the recipient can find out who the sender is when the message is viewed.

If the SAPP is provided, the forwarding server will check if the SAPP agrees with the stored SAPP data. In one implementation, the message sent using a SAPP can be authenticated by attaching a Message Authentication Code (MAC). For example, attaching HASH(SAPP+HASH (SAPP+Message)) to the message will provide such an authentication and will protect the integrity of the message. If the SAPP agrees and the MAC matches, the delivery is allowed.

If the sender/server connection is occurring in a non-interactive mode, and if a correct SAPP is not received (either the sender has forgotten their SAPP, or has not created a SAPP, or otherwise does not know the SAPP), the user is directed to create or re-create an authorization pass phrase. If the sender wants to create a SAPP (348), the process continues by allowing the user to create a SAPP (352). In one implementation, a link to a website where the user can create an authorization phrase is executed. The process for creating an authorization pass phrase, either SAPP or RAPP, is described in greater detail in FIG. 2*g*. Once a SAPP is created, the process continues back at step (340).

Referring now to FIG. 2*g*, a process for creating an authorization pass phrase begins by displaying a web page that requests a user to enter an E-mail address and an authorization pass phrase (either SAPP or RAPP or both) (360). Upon receipt of the E-mail address and authorization phrase (361), a confirming E-mail message is sent to the user (362). The E-mail prompts the user to send a confirmation message to the forwarding service. The forwarding service receives the confirmation (364) and "activates" user's E-mail address including storing the authorization pass phrase (RAPP/SAPP) in a respective location in the access list 199 in an entry associated with the user (366). Thereafter the respective send or receive process continues as described in association with FIGS. 2f and 2h, respectively.

In one implementation, the SAPP and RAPP are not directly stored. Instead, a combination of a 128 bit "salt" and a HASH (passphrase+email address+salt) is stored on the forwarding server. Each user has a different salt. In this way, even if the database file that contains the SAPP and RAPP information is stolen, one is still required to mount a brute force (dictionary) attack to find each passphrase.

FIG. 3a shows a sample user interface presented by wrapper application 128 which can be manipulated to compose a secure E-mail message. Fields are included for entering a recipient's E-mail address 775, a sender's E-mail address 776, subject 777, attachments field 779 and message body 780. Buttons are included for attaching files 793, saving a draft 794, clearing a form 795, printing a message 796, looking-up an E-mail address 797 and editing an E-mail ID 798. Activation of button 781 can provide access to a conventional address book that includes E-mail addresses (along with other recipient information). Subject 777 is a placeholder for a title to be displayed when an E-mail containing a secure E-mail message is displayed in a conventional E-mail application. Attachments field 779 is a field used to indicate documents that have been attached to the secure message. Files can be attached to a message using attachment button 790. All attachments are first compressed and then encrypted along with the contents of the message body 780 forming the encrypted portion of the E-mail message transmitted to the recipient. Clicking the send button 792 will start the sending process, which includes prompting for signature phrase, retrieving recipient's public key and time stamp certificate, signing the message, encrypting the message, wrapping the encrypted message into a MIME message, and sending the message to the recipient using SMTP or HTTP relay.

FIG. 3b shows a user interface 791 presented by wrapping application 128 (FIG. 1) when send button 792 is depressed. A field is included for entering a sender's signature phrase 799. The user is prompted to enter a signature phrase. If the signature phrase is correct, then a public key for the recipient (or forwarding service) is retrieved along with a time stamp certificate. Upon receipt of the public key and time stamp certificate, the wrapping application encrypts and wraps the message and sends the message and time stamp certificate to the recipient. Alternatively, the message can be encrypted, wrapped and forwarded to forwarding service as described above. The sender may specify a SMTP server to use, or in the alternative, in one implementation, key server 108 may specify a SMTP server for the user. In one implementation, a HTTP to SMTP relay can be used to send the message.

Key Server Processes

Key server 108 (FIG. 1) includes numerous processes in support of the transmission of secure E-mail messages. The operation of key server 108 is described in greater detail in "Secure Messaging System."

Recipient Process

The process for viewing a secure E-mail message is described above and shown in FIGS. 2d and 2e. The process can include verifying the sender's and the server's signatures, verifying the authenticity of the server's public key and retrieving the status of the sender's public key. Authentication data (e.g., the status of the sender's public key) is displayed along with the contents of the secure message by viewer 130 or web browser 123 (FIG. 1a).

The process for receiving a secure message by a minimally configured recipient is described above and shown in FIG. 2e. Step 324 specifies when a RAPP is sent to the forwarding service. A user (recipient) that desires to make use of the forwarding service 195 may be required to create a RAPP. The RAPP can be a unique pass phrase. A process 324 for providing a pass phrase to the forwarding service 195 including creating a RAPP is shown in FIG. 2h and begins after the forwarding service receives a message for web or other delivery to the recipient. The forwarding service determines if the recipient has a RAPP (370). If not, then the recipient is prompted to create a RAPP (372). In one implementation, the recipient is directed to a web site that includes instructions for creating an authorization pass phrase. The process for creating a RAPP is described above and shown in FIG. 2g. If the recipient has a RAPP, then the user is prompted to provide the RAPP (374). The RAPP provided by the recipient is checked to determine if it matches the data on file (e.g., the RAPP or SAPP stored in the access list 199) (376). If no match is detected, the recipient may be prompted to try again (378). In one implementation, the user is limited to three incorrect attempts before he/she is prevented from retrieving the message. Assuming the RAPP is correct, the process for displaying and viewing the message is continued starting at step 326 of FIG. 2e. In one implementation, a SAPP may be used in lieu of a RAPP to view a message.

A user interface presented by the viewer application is shown in FIG. 4a. Fields, similar to the fields presented by the wrapping application user interface, display various portions of the secure E-mail contents after decryption. Buttons are included for opening a message 902, replying to a message 904, replying to all recipients 906, forwarding a message 908, clearing a message 910, and printing a message 912. In addition, a series of visual indicators 900 are provided to indicate the status of the signature verification process. In one implementation, one or more of the three visual indicators 900 are illuminated, as described below, in accordance with the information provided from key server 108 (FIG. 1a). The status information returned from key server 108 (or key retrieval server 180) of FIG. 1a includes valid time and date(s) 914. The time stamp recovered from the decrypted received package is compared to the status information. One or more indicators that look similar to a traffic light or other differentiating indicator are illuminated depending on the comparison results. Combinations can include:

green only illuminated—valid signature detected;
 yellow and green illuminated—signature is mathematically valid, public key of sender was valid at time sent, but now is out of date or otherwise invalid;
 yellow only illuminated—signature is mathematically valid, but the connection to the key server is not functioning and the recipient computer cannot connect for confirmation from the key server; and
 red only illuminated—all other conditions not listed above, including no key posted, no match of the public key with the E-mail address, tampering has occurred, message was signed after the key has been deactivated, etc.

A user interface presented by the web browser for viewing messages is shown in FIG. 4b. Fields, similar to the fields presented by the viewer user interface, display various portions of the secure E-mail contents. Buttons can be included for replying to a message 904, reply to all recipients 906, forwarding a message 910 and deleting a message 912. In addition, a series of visual indicators 900 can be provided to indicate authentication of the sender (e.g., the status of the signature verification process performed at the forwarding service 195). In one implementation, one or more of the three visual indicators 900 are illuminated, as described above, in accordance with the information originally provided from key server 108 (FIG. 1a) or other originating source. The status information can include valid time and date(s) 914 as well as authentication data.

Forwarding Proxy (HTTP Post)

Referring to FIG. 1a, wrapping application 128 can send secure E-mail messages directly, or a conventional E-mail system can be used to forward the secure portions of the messages (as part of an attachment to a conventional E-mail message) directly to the recipient or through a forwarding service. While one implementation of the invention requires the client sender to have access to a SMTP server, an alternative implementation provides a method for easy transmission when no SMTP server is accessible. Wrapping application 128 can invoke HTTP post application 124 to send the secure message with an HTTP post. Transmission by HTTP post is described in greater detail in "Secure Messaging System."

Alternative Implementations

The forwarding service 195 of FIG. 1a can be used to forward messages from a plurality of different sender types. Referring to FIG. 5, an alternative implementation of a secure forwarding service 195 is shown. Messages from any number of types of senders 102 are addressed and transmitted to the forwarding service 195 using conventional or other transmission means. The conventional transmission means can include an E-mail, a web form or other form of post. Each message is processed by the forwarding service 195 and stored in the queue structure 197. A user interface presented by the web browser for sending messages is shown in FIG. 4b. Fields, similar to the fields presented by the wrapping application user interface FIG. 3a), allow the user to enter various portions of the message content, passphrase, attachments and other selections.

Forwarding service 195 processes each message including providing parsing, decryption, authentication and other services. Filter layer 193 processes each message to produce a standard format message that is stored in the queue structure 197. The standard format includes a standardized authentication block 502 and a message block 504.

The processing performed by filter layer 193 is uniquely determined by the type of message received. For example, filter layer 193 can include an application specific decryption and authentication routine for ZixMail messages. In this example, a decryption algorithm using a private key of the forwarding service extracts the original message and a sender signature. Thereafter, an authentication routine is used to verify the authenticity of the sender in accordance with the ZixMail secure messaging system described in "Secure Messaging System."

Alternatively, other decryption algorithms or authentication routines can be invoked in the filter layer 193. The particular processes invoked depend on the format of the message received. At a minimum, parsing services are provided to extract sender and recipient information from the received message. The received message is parsed to extract the address for the intended recipient that is in turn used to generate an E-mail message or other message form for transmission to the recipient. The E-mail message can include an encrypted message (encrypted in accordance with recipient preferences), a link to a message stored in queue structure 197 or a phone number to call. Sender information is extracted to verify the sender is authorized to use the forwarding services. In one implementation, the message includes an authorization pass phrase (SAPP) that is linked to the sender's E-mail address. The filter layer performs a lookup in the access list 199 on the sender's E-mail address to verify the sender is an authorized user.

One or more different types of senders 102 may provide messages to be forwarded to one or more recipients 104. Sender 102 may be a ZixMail sender 102a that forwards secure ZixMail messages in accordance with the description provided above. Sender 102 may be another secure messaging sender (e.g., a S/MIME sender having an X.509 certificate 102b, a Pretty Good Privacy (PGP) sender 102c). As used herein, a "secure messaging sender" is a client computer (or other device) that includes one or more client applications that provides secure messaging services. The application can provide encryption, decryption and key services or support a communication protocol that includes some form of security using either encryption or certificate services. Examples of client applications that include secure messaging services include Microsoft's Outlook application. Other applications may provide secure messaging services using one or more certificates generated by, for example, EnTrust, Inc., or VeriSign, Inc.

Each sender 102 desiring to use the forwarding service 195 addresses and subsequently sends the intended message to the forwarding service 195. Each intended message is addressed to forwarding service 195 using a unique address. In one implementation, messages are addressed according to sender type. For example, messages from a ZixMail client are addressed to the forwarding service 195 using the address ZixMail@secure-forwarding-service.com. The unique addressing can be used to invoke particular processing operations in the filter layer 193 for each message.

Each sender may utilize a unique format for a message. The format may be proprietary or non-proprietary. In order to support such diverse formats, the forwarding service 195 includes a filter unit (in filter layer 193) for processing each message type.

In general, the processes required to be executed by the sender (client application) include creating a message to be transferred to a recipient (using the forwarding service 195), addressing the message to the forwarding service, including a recipient address and authorization data in the message and sending the message to the forwarding service 195.

The forwarding service 195 invokes the particular filter unit associated with the message type to parse, decrypt and authenticate the received message. No matter the form, each message generally includes header information and message data. The header information includes, at a minimum, sender information and a recipient address. In one implementation, the sender information includes the sender's address and a sender identifier (SAPP) that can be used to verify the sender is authorized to use the forwarding service 195. In addition, the header may include other information or service designators for one or more services to be invoked by the filter layer 193. For example, the header may include authorization data for the sender (SAPP), a request for a return receipt, a request for anonymous forwarding of the message (anonymizing the "from" field in the message sent to recipient) and other information. The message also can include a message body and attachments.

Alternatively, the sender can be a conventional E-mail user 102d or a web-form user 102e (where a message is constructed as part of a form presented on a web page and subsequently submitted to the forwarding service 195 as response data). That is, the message need not be sent by a secure messaging sender, and can be provided through conventional means directly to the forwarding service 195. While the security level of these communications may be lower than that provided using a secure messaging sender, the forwarding service 195 can still provide an extra measure of security (i.e., using the SSL protocol) for these "non secure messages". In addition, the sender can be required to have an authorization pass phrase (SAPP) set up with the forwarding service 195 as described in further detail above. Examples of other senders 102 can include an HTTP Post application 102f, a facsimile device 102g, a messaging device (e.g., a cellular telephone or pager) 102h, or other digital or analog device (PDA or the like). One or more of these devices may be coupled via a gateway to the network 106 (e.g., Internet).

No matter the sender type, the message generated by the sender 102 must be properly addressed (to the forwarding service and include any type indicator for invoking any special processing in the filter layer 193), must include a recipient designator (either in the header, message body or in the address) and include appropriate identifying data that can be used to verify the sender is an authorized user of the forwarding services.

Referring to FIG. 6, a process implemented by the forwarding service includes receiving a message from a sender (602). The message is processed by the filter layer (604). The processing includes decrypting the message in accordance with a decryption algorithm specified for the message type (optional), parsing the message to extract sender and recipient information, checking to determine if the sender is an authorized user of the forwarding service, authenticating the sender and any other specified services. Thereafter, a check is made to determine recipient delivery preferences (605). If the user has preferences, a check is made to determine if the preference specifies web delivery (606).

If the preferences are not for web delivery, then a message is constructed (630) and forwarded to the recipient in accordance with recipient preferences (632). The process of constructing a message can include the encrypting of the message using a specified encryption algorithm (e.g., invoking encryption service 189) or the sending of the message in clear text. Thereafter the process ends.

If no preferences are located or web delivery is specified, then the process continues at step 607 where a standard encrypted format message is constructed and populated with the authentication data and the message including any attachments. A unique random number is generated (608) and the standard format message is stored in the queue structure 197 using the random number as part of an index (610). The forwarding engine 198 generates an E-mail message that includes a hypertext link (e.g., https://secure-forwarding-.com// readmessage?index=a202fa8048d61ad50824ab5bcd705cf) that points to the message stored in the queue structure.

When a recipient invokes the link, a page request is transmitted to and received at the secure forwarding service 195 that includes the index information. An authorization pass phrase may be required of the recipient (612) before sending the actual message contents. In one implementation, the first time that a recipient uses the secure forwarding service 195, the recipient can be requested to establish an authorization pass phrase (RAPP). Subsequent retrievals of messages by the same recipient (i.e., the same E-mail address) can be made by providing the authorization pass phrase (RAPP). In one implementation, the SAPP may be used in lieu of a RAPP. When the page request is received by the web front end of forwarding service 195, a check is made to determine if the authorization pass phrase received is correct (as appropriate) (614). An authorization pass phrase/preference data pairing indexed by E-mail address (E-mail, RAPP, SAPP, and preference data) can be stored in access list 199 and checked to ensure that the recipient is the authorized to retrieve the message. Assuming that the authorization pass phrase (RAPP) is correct, forwarding service 195 retrieves the standard format message from the secure queue structure 197 using the index information provided in the page request (616). Thereafter, the page is decrypted, returned to the recipient and then loaded for display by the recipient computer's web browser (618).

The common filtering (using filter layer 193) and storage format (standard message format) allows for alternate branding of the services provided by the secure forwarding service. For example, Brand X company can advertise secure forwarding services using its own company brand name. The brand name can be used as the message type identifier when forwarding messages to the secure forwarding service. The brand can be a pointer to a particular message type including a secure message format. In this way, all client messages can be delivered under the client brand using the central services of the forwarding service.

The architecture for forwarding services includes a generic forwarding mechanism that can be configured to support new or changing messaging services. Only the front end filtering operations are required to be added/updated when adding a new message type, the remaining architecture and processes are unaffected by a new (updated) content provider. The standard message format, which may also be branded, is used for delivery of all messages via browsers to recipients.

In one implementation, each time a message is retrieved from the forwarding service a receipt can be generated that can be returned to or picked up by the sender. That is, the sender can specify a return receipt be generated by the forwarding service 195 and stored for future pick up or immediate delivery to the sender. Forwarding engine 198 can be configured to forward return receipts to the sender. The receipt can be used to indicate that the message was retrieved by the recipient.

In one implementation, messages can be forwarded with carbon copies (cc) sent to the sender and blind carbon copies (bcc) sent to the other designated parties. The process for sending a message to each recipient (a cc or a bcc recipient) is the same as described above While this invention has been described in terms of several preferred implementations, it is contemplated that alterations, modifications and permutations thereof will become apparent to those skilled in the art upon a reading of the specification and study of the drawings.

Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A computer implemented method for sending a secure message to multiple recipients comprising:
   encrypting a message;
   sending the encrypted message to a forwarding server, including providing a list of recipients to the forwarding server;

at the forwarding server, decrypting the encrypted message and determining a delivery preference for each recipient in the list of recipients; and for each recipient that has a delivery preference, re-encrypting the message and delivering the re-encrypted message in accordance with the delivery preference.

2. The computer implemented method of claim 1, further comprising notifying each recipient that does not have a delivery preference that the message is available for retrieval.

3. The computer implemented method of claim 2, wherein:

notifying the recipient includes notifying the recipient that the message is available for retrieval through a secure link.

4. A computing system for providing secure message services for messages addressed to multiple recipients, comprising:

a forwarding engine executing on a computer operable to:

receive an encrypted message and a list of recipients;

decrypt the encrypted message;

determine a delivery preference for each recipient in the list of recipients;

for each recipient that has a delivery preference, re-encrypt the message and deliver the re-encrypted message in accordance with the delivery preference; and for each recipient that does not have a delivery preference, notify the recipient that the message is available for retrieval.

5. The computing system of claim 4, wherein the forwarding engine is operable to:

notify the recipient that the message is available for retrieval through a secure link.

6. A computer implemented method for sending a secure message to multiple recipients comprising:

encrypting a message;

sending the encrypted message to a forwarding server, including providing a list of recipients to the forwarding server;

at the forwarding server, decrypting the encrypted message and determining a decryption capability for each recipient in the list of recipients; and for each recipient, re-encrypting the decrypted message according to the decryption capability of the recipient and delivering the re-encrypted message to the recipient.

7. The computer implemented method of claim 6, further comprising:

for each recipient that does not have decryption capability or the decryption capability cannot be determined, notifying the recipient that the message is available for retrieval.

8. The computer implemented method of claim 7, wherein:

notifying the recipient includes notifying the recipient that the message is available for retrieval through a secure link.

9. The computer implemented method of claim 6, wherein:

determining a decryption capability for each recipient includes determining whether each recipient has an associated published key.

10. The computer implemented method of claim 6, wherein:

determining a decryption capability for each recipient includes determining whether each recipient has an associated certificate.

11. The computer implemented method of claim 6, wherein:

determining the decryption capability of each recipient in the list of recipients includes selecting one decryption capability in accordance with a recipient's preference if the recipient has more than one decryption capability.

12. A computing system for providing secure message services for messages addressed to multiple recipients, comprising:

a forwarding engine executing on a computer operable to:

receive an encrypted message and a list of recipients;

decrypt the encrypted message;

for each recipient in the list of recipients, determine whether the recipient has a decryption capability;

for each recipient with a decryption capability, re-encrypt the message according to the decryption capability of the recipient and deliver the re-encrypted message to the recipient; and for each recipient that does not have a decryption capability, notify the recipient that the message is available for retrieval.

13. The computing system of claim 12, wherein the forwarding engine is operable to:

notify the recipient that the message is available for retrieval through a secure link.

* * * * *